US008170355B2

(12) United States Patent  
Song

(10) Patent No.: US 8,170,355 B2  
(45) Date of Patent: May 1, 2012

(54) IMAGE ENCODING/DECODING METHOD AND APPARATUS

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1260 days.

(21) Appl. No.: 11/727,079

(22) Filed: Mar. 23, 2007

(65) Prior Publication Data

US 2007/0223021 A1  Sep. 27, 2007

Related U.S. Application Data

(60) Provisional application No. 60/784,756, filed on Mar. 23, 2006, provisional application No. 60/786,723, filed on Mar. 29, 2006.

(30) Foreign Application Priority Data

Jul. 3, 2006  (KR) .................. 10-2006-0061926

(51) Int. Cl.
*G06K 9/36*  (2006.01)
*G06K 9/46*  (2006.01)

(52) U.S. Cl. .................. 382/233; 382/166; 382/238
(58) Field of Classification Search .................. 382/233, 382/166, 238
See application file for complete search history.

(56) References Cited

U.S. PATENT DOCUMENTS

| 7,697,783 | B2 * | 4/2010 | Lee et al. ............ 382/275 |
| 7,792,370 | B2 * | 9/2010 | Sun ...................... 382/232 |
| 2005/0111741 | A1 * | 5/2005 | Kim et al. ............ 382/232 |

FOREIGN PATENT DOCUMENTS

| JP | 11-88888 A | 3/1999 |
| JP | 11-168728 A | 6/1999 |
| JP | 2003-189309 A | 7/2003 |

OTHER PUBLICATIONS

Ashok K Rao et al: "Multispectral Data Compression Using Bidirectional Interband Prediction", IEEE Transactions on Geoscience and Remote Sensing, vol. 34, No. 2, Mar. 1, 1996, pp. 385-397, XP011020707, ISSN: 0196-2892.

Benierbah S et al: "Lossless color and multispectral images coding with inter-band compensated prediction", Control, Communications and Signal Processing, 2004, Mar. 21, 2004, pp. 427-430, XP010705963.

Communication issued on Sep. 2, 2011 in counterpart European Application No. 07715738.6.

Goffman-Vinopal L et al: "Color image compression using inter-color correlation", International Conference on Image Processing (ICIP),, vol. 2, Sep. 22, 2002, pp. 353-356, XP010607981.

Woo-Shik Kim et al: "RGB Video Coding Using Residual Color Transform", Samsung Journal of Innovative Technology, vol. 1, No. 1, Aug. 1, 2005, pp. 21-31, XP55005343.

* cited by examiner

*Primary Examiner* — Phuoc Tran

(74) *Attorney, Agent, or Firm* — Sughrue Mion, PLLC

(57) ABSTRACT

An image encoding/decoding method and apparatus are provided, in which one of color component images forming an image is predicted from a different color component image using a correlation between the color component images. A first color component image selected from the color component images is encoded by intra prediction, and the other color component images are predicted using the reconstructed first color component image. Therefore, color distortion, which may occur when transforming an image color format to another color format, is prevented, thereby improving encoding efficiency.

12 Claims, 18 Drawing Sheets

| $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
|---|---|---|---|---|---|---|---|---|---|---|---|---|---|---|---|
| $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

| $b_{0,0}$ | $b_{0,1}$ | $b_{0,2}$ | $b_{0,3}$ | $b_{0,4}$ | $b_{0,5}$ | $b_{0,6}$ | $b_{0,7}$ | $b_{0,8}$ | $b_{0,9}$ | $b_{0,10}$ | $b_{0,11}$ | $b_{0,12}$ | $b_{0,13}$ | $b_{0,14}$ | $b_{0,15}$ |
|---|---|---|---|---|---|---|---|---|---|---|---|---|---|---|---|
| $b_{1,0}$ | $b_{1,1}$ | $b_{1,2}$ | $b_{1,3}$ | $b_{1,4}$ | $b_{1,5}$ | $b_{1,6}$ | $b_{1,7}$ | $b_{1,8}$ | $b_{1,9}$ | $b_{1,10}$ | $b_{1,11}$ | $b_{1,12}$ | $b_{1,13}$ | $b_{1,14}$ | $b_{1,15}$ |
| $b_{2,0}$ | $b_{2,1}$ | $b_{2,2}$ | $b_{2,3}$ | $b_{2,4}$ | $b_{2,5}$ | $b_{2,6}$ | $b_{2,7}$ | $b_{2,8}$ | $b_{2,9}$ | $b_{2,10}$ | $b_{2,11}$ | $b_{2,12}$ | $b_{2,13}$ | $b_{2,14}$ | $b_{2,15}$ |
| $b_{3,0}$ | $b_{3,1}$ | $b_{3,2}$ | $b_{3,3}$ | $b_{3,4}$ | $b_{3,5}$ | $b_{3,6}$ | $b_{3,7}$ | $b_{3,8}$ | $b_{3,9}$ | $b_{3,10}$ | $b_{3,11}$ | $b_{3,12}$ | $b_{3,13}$ | $b_{3,14}$ | $b_{3,15}$ |
| $b_{4,0}$ | $b_{4,1}$ | $b_{4,2}$ | $b_{4,3}$ | $b_{4,4}$ | $b_{4,5}$ | $b_{4,6}$ | $b_{4,7}$ | $b_{4,8}$ | $b_{4,9}$ | $b_{4,10}$ | $b_{4,11}$ | $b_{4,12}$ | $b_{4,13}$ | $b_{4,14}$ | $b_{4,15}$ |
| $b_{5,0}$ | $b_{5,1}$ | $b_{5,2}$ | $b_{5,3}$ | $b_{5,4}$ | $b_{5,5}$ | $b_{5,6}$ | $b_{5,7}$ | $b_{5,8}$ | $b_{5,9}$ | $b_{5,10}$ | $b_{5,11}$ | $b_{5,12}$ | $b_{5,13}$ | $b_{5,14}$ | $b_{5,15}$ |
| $b_{6,0}$ | $b_{6,1}$ | $b_{6,2}$ | $b_{6,3}$ | $b_{6,4}$ | $b_{6,5}$ | $b_{6,6}$ | $b_{6,7}$ | $b_{6,8}$ | $b_{6,9}$ | $b_{6,10}$ | $b_{6,11}$ | $b_{6,12}$ | $b_{6,13}$ | $b_{6,14}$ | $b_{6,15}$ |
| $b_{7,0}$ | $b_{7,1}$ | $b_{7,2}$ | $b_{7,3}$ | $b_{7,4}$ | $b_{7,5}$ | $b_{7,6}$ | $b_{7,7}$ | $b_{7,8}$ | $b_{7,9}$ | $b_{7,10}$ | $b_{7,11}$ | $b_{7,12}$ | $b_{7,13}$ | $b_{7,14}$ | $b_{7,15}$ |
| $b_{8,0}$ | $b_{8,1}$ | $b_{8,2}$ | $b_{8,3}$ | $b_{8,4}$ | $b_{8,5}$ | $b_{8,6}$ | $b_{8,7}$ | $b_{8,8}$ | $b_{8,9}$ | $b_{8,10}$ | $b_{8,11}$ | $b_{8,12}$ | $b_{8,13}$ | $b_{8,14}$ | $b_{8,15}$ |
| $b_{9,0}$ | $b_{9,1}$ | $b_{9,2}$ | $b_{9,3}$ | $b_{9,4}$ | $b_{9,5}$ | $b_{9,6}$ | $b_{9,7}$ | $b_{9,8}$ | $b_{9,9}$ | $b_{9,10}$ | $b_{9,11}$ | $b_{9,12}$ | $b_{9,13}$ | $b_{9,14}$ | $b_{9,15}$ |
| $b_{10,0}$ | $b_{10,1}$ | $b_{10,2}$ | $b_{10,3}$ | $b_{10,4}$ | $b_{10,5}$ | $b_{10,6}$ | $b_{10,7}$ | $b_{10,8}$ | $b_{10,9}$ | $b_{10,10}$ | $b_{10,11}$ | $b_{10,12}$ | $b_{10,13}$ | $b_{10,14}$ | $b_{10,15}$ |
| $b_{11,0}$ | $b_{11,1}$ | $b_{11,2}$ | $b_{11,3}$ | $b_{11,4}$ | $b_{11,5}$ | $b_{11,6}$ | $b_{11,7}$ | $b_{11,8}$ | $b_{11,9}$ | $b_{11,10}$ | $b_{11,11}$ | $b_{11,12}$ | $b_{11,13}$ | $b_{11,14}$ | $b_{11,15}$ |
| $b_{12,0}$ | $b_{12,1}$ | $b_{12,2}$ | $b_{12,3}$ | $b_{12,4}$ | $b_{12,5}$ | $b_{12,6}$ | $b_{12,7}$ | $b_{12,8}$ | $b_{12,9}$ | $b_{12,10}$ | $b_{12,11}$ | $b_{12,12}$ | $b_{12,13}$ | $b_{12,14}$ | $b_{12,15}$ |
| $b_{13,0}$ | $b_{13,1}$ | $b_{13,2}$ | $b_{13,3}$ | $b_{13,4}$ | $b_{13,5}$ | $b_{13,6}$ | $b_{13,7}$ | $b_{13,8}$ | $b_{13,9}$ | $b_{13,10}$ | $b_{13,11}$ | $b_{13,12}$ | $b_{13,13}$ | $b_{13,14}$ | $b_{13,15}$ |
| $b_{14,0}$ | $b_{14,1}$ | $b_{14,2}$ | $b_{14,3}$ | $b_{14,4}$ | $b_{14,5}$ | $b_{14,6}$ | $b_{14,7}$ | $b_{14,8}$ | $b_{14,9}$ | $b_{14,10}$ | $b_{14,11}$ | $b_{14,12}$ | $b_{14,13}$ | $b_{14,14}$ | $b_{14,15}$ |
| $b_{15,0}$ | $b_{15,1}$ | $b_{15,2}$ | $b_{15,3}$ | $b_{15,4}$ | $b_{15,5}$ | $b_{15,6}$ | $b_{15,7}$ | $b_{15,8}$ | $b_{15,9}$ | $b_{15,10}$ | $b_{15,11}$ | $b_{15,12}$ | $b_{15,13}$ | $b_{15,14}$ | $b_{15,15}$ |

| $r_{0,0}$ | $r_{0,1}$ | $r_{0,2}$ | $r_{0,3}$ | $r_{0,4}$ | $r_{0,5}$ | $r_{0,6}$ | $r_{0,7}$ | $r_{0,8}$ | $r_{0,9}$ | $r_{0,10}$ | $r_{0,11}$ | $r_{0,12}$ | $r_{0,13}$ | $r_{0,14}$ | $r_{0,15}$ |
|---|---|---|---|---|---|---|---|---|---|---|---|---|---|---|---|
| $r_{1,0}$ | $r_{1,1}$ | $r_{1,2}$ | $r_{1,3}$ | $r_{1,4}$ | $r_{1,5}$ | $r_{1,6}$ | $r_{1,7}$ | $r_{1,8}$ | $r_{1,9}$ | $r_{1,10}$ | $r_{1,11}$ | $r_{1,12}$ | $r_{1,13}$ | $r_{1,14}$ | $r_{1,15}$ |
| $r_{2,0}$ | $r_{2,1}$ | $r_{2,2}$ | $r_{2,3}$ | $r_{2,4}$ | $r_{2,5}$ | $r_{2,6}$ | $r_{2,7}$ | $r_{2,8}$ | $r_{2,9}$ | $r_{2,10}$ | $r_{2,11}$ | $r_{2,12}$ | $r_{2,13}$ | $r_{2,14}$ | $r_{2,15}$ |
| $r_{3,0}$ | $r_{3,1}$ | $r_{3,2}$ | $r_{3,3}$ | $r_{3,4}$ | $r_{3,5}$ | $r_{3,6}$ | $r_{3,7}$ | $r_{3,8}$ | $r_{3,9}$ | $r_{3,10}$ | $r_{3,11}$ | $r_{3,12}$ | $r_{3,13}$ | $r_{3,14}$ | $r_{3,15}$ |
| $r_{4,0}$ | $r_{4,1}$ | $r_{4,2}$ | $r_{4,3}$ | $r_{4,4}$ | $r_{4,5}$ | $r_{4,6}$ | $r_{4,7}$ | $r_{4,8}$ | $r_{4,9}$ | $r_{4,10}$ | $r_{4,11}$ | $r_{4,12}$ | $r_{4,13}$ | $r_{4,14}$ | $r_{4,15}$ |
| $r_{5,0}$ | $r_{5,1}$ | $r_{5,2}$ | $r_{5,3}$ | $r_{5,4}$ | $r_{5,5}$ | $r_{5,6}$ | $r_{5,7}$ | $r_{5,8}$ | $r_{5,9}$ | $r_{5,10}$ | $r_{5,11}$ | $r_{5,12}$ | $r_{5,13}$ | $r_{5,14}$ | $r_{5,15}$ |
| $r_{6,0}$ | $r_{6,1}$ | $r_{6,2}$ | $r_{6,3}$ | $r_{6,4}$ | $r_{6,5}$ | $r_{6,6}$ | $r_{6,7}$ | $r_{6,8}$ | $r_{6,9}$ | $r_{6,10}$ | $r_{6,11}$ | $r_{6,12}$ | $r_{6,13}$ | $r_{6,14}$ | $r_{6,15}$ |
| $r_{7,0}$ | $r_{7,1}$ | $r_{7,2}$ | $r_{7,3}$ | $r_{7,4}$ | $r_{7,5}$ | $r_{7,6}$ | $r_{7,7}$ | $r_{7,8}$ | $r_{7,9}$ | $r_{7,10}$ | $r_{7,11}$ | $r_{7,12}$ | $r_{7,13}$ | $r_{7,14}$ | $r_{7,15}$ |
| $r_{8,0}$ | $r_{8,1}$ | $r_{8,2}$ | $r_{8,3}$ | $r_{8,4}$ | $r_{8,5}$ | $r_{8,6}$ | $r_{8,7}$ | $r_{8,8}$ | $r_{8,9}$ | $r_{8,10}$ | $r_{8,11}$ | $r_{8,12}$ | $r_{8,13}$ | $r_{8,14}$ | $r_{8,15}$ |
| $r_{9,0}$ | $r_{9,1}$ | $r_{9,2}$ | $r_{9,3}$ | $r_{9,4}$ | $r_{9,5}$ | $r_{9,6}$ | $r_{9,7}$ | $r_{9,8}$ | $r_{9,9}$ | $r_{9,10}$ | $r_{9,11}$ | $r_{9,12}$ | $r_{9,13}$ | $r_{9,14}$ | $r_{9,15}$ |
| $r_{10,0}$ | $r_{10,1}$ | $r_{10,2}$ | $r_{10,3}$ | $r_{10,4}$ | $r_{10,5}$ | $r_{10,6}$ | $r_{10,7}$ | $r_{10,8}$ | $r_{10,9}$ | $r_{10,10}$ | $r_{10,11}$ | $r_{10,12}$ | $r_{10,13}$ | $r_{10,14}$ | $r_{10,15}$ |
| $r_{11,0}$ | $r_{11,1}$ | $r_{11,2}$ | $r_{11,3}$ | $r_{11,4}$ | $r_{11,5}$ | $r_{11,6}$ | $r_{11,7}$ | $r_{11,8}$ | $r_{11,9}$ | $r_{11,10}$ | $r_{11,11}$ | $r_{11,12}$ | $r_{11,13}$ | $r_{11,14}$ | $r_{11,15}$ |
| $r_{12,0}$ | $r_{12,1}$ | $r_{12,2}$ | $r_{12,3}$ | $r_{12,4}$ | $r_{12,5}$ | $r_{12,6}$ | $r_{12,7}$ | $r_{12,8}$ | $r_{12,9}$ | $r_{12,10}$ | $r_{12,11}$ | $r_{12,12}$ | $r_{12,13}$ | $r_{12,14}$ | $r_{12,15}$ |
| $r_{13,0}$ | $r_{13,1}$ | $r_{13,2}$ | $r_{13,3}$ | $r_{13,4}$ | $r_{13,5}$ | $r_{13,6}$ | $r_{13,7}$ | $r_{13,8}$ | $r_{13,9}$ | $r_{13,10}$ | $r_{13,11}$ | $r_{13,12}$ | $r_{13,13}$ | $r_{13,14}$ | $r_{13,15}$ |
| $r_{14,0}$ | $r_{14,1}$ | $r_{14,2}$ | $r_{14,3}$ | $r_{14,4}$ | $r_{14,5}$ | $r_{14,6}$ | $r_{14,7}$ | $r_{14,8}$ | $r_{14,9}$ | $r_{14,10}$ | $r_{14,11}$ | $r_{14,12}$ | $r_{14,13}$ | $r_{14,14}$ | $r_{14,15}$ |
| $r_{15,0}$ | $r_{15,1}$ | $r_{15,2}$ | $r_{15,3}$ | $r_{15,4}$ | $r_{15,5}$ | $r_{15,6}$ | $r_{15,7}$ | $r_{15,8}$ | $r_{15,9}$ | $r_{15,10}$ | $r_{15,11}$ | $r_{15,12}$ | $r_{15,13}$ | $r_{15,14}$ | $r_{15,15}$ |

FIG. 11A

|  |  |  |  |  |  |  |  |  |  |  |  |  |  |  |  |
|---|---|---|---|---|---|---|---|---|---|---|---|---|---|---|---|
| $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
| $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

FIG. 11B

|  |  |  |  |  |  |  |  |  |  |  |  |  |  |  |  |
|---|---|---|---|---|---|---|---|---|---|---|---|---|---|---|---|
| $b_{0,0}$ | $b_{0,1}$ | $b_{0,2}$ | $b_{0,3}$ | $b_{0,4}$ | $b_{0,5}$ | $b_{0,6}$ | $b_{0,7}$ | $b_{0,8}$ | $b_{0,9}$ | $b_{0,10}$ | $b_{0,11}$ | $b_{0,12}$ | $b_{0,13}$ | $b_{0,14}$ | $b_{0,15}$ |
| $b_{1,0}$ | $b_{1,1}$ | $b_{1,2}$ | $b_{1,3}$ | $b_{1,4}$ | $b_{1,5}$ | $b_{1,6}$ | $b_{1,7}$ | $b_{1,8}$ | $b_{1,9}$ | $b_{1,10}$ | $b_{1,11}$ | $b_{1,12}$ | $b_{1,13}$ | $b_{1,14}$ | $b_{1,15}$ |
| $b_{2,0}$ | $b_{2,1}$ | $b_{2,2}$ | $b_{2,3}$ | $b_{2,4}$ | $b_{2,5}$ | $b_{2,6}$ | $b_{2,7}$ | $b_{2,8}$ | $b_{2,9}$ | $b_{2,10}$ | $b_{2,11}$ | $b_{2,12}$ | $b_{2,13}$ | $b_{2,14}$ | $b_{2,15}$ |
| $b_{3,0}$ | $b_{3,1}$ | $b_{3,2}$ | $b_{3,3}$ | $b_{3,4}$ | $b_{3,5}$ | $b_{3,6}$ | $b_{3,7}$ | $b_{3,8}$ | $b_{3,9}$ | $b_{3,10}$ | $b_{3,11}$ | $b_{3,12}$ | $b_{3,13}$ | $b_{3,14}$ | $b_{3,15}$ |
| $b_{4,0}$ | $b_{4,1}$ | $b_{4,2}$ | $b_{4,3}$ | $b_{4,4}$ | $b_{4,5}$ | $b_{4,6}$ | $b_{4,7}$ | $b_{4,8}$ | $b_{4,9}$ | $b_{4,10}$ | $b_{4,11}$ | $b_{4,12}$ | $b_{4,13}$ | $b_{4,14}$ | $b_{4,15}$ |
| $b_{5,0}$ | $b_{5,1}$ | $b_{5,2}$ | $b_{5,3}$ | $b_{5,4}$ | $b_{5,5}$ | $b_{5,6}$ | $b_{5,7}$ | $b_{5,8}$ | $b_{5,9}$ | $b_{5,10}$ | $b_{5,11}$ | $b_{5,12}$ | $b_{5,13}$ | $b_{5,14}$ | $b_{5,15}$ |
| $b_{6,0}$ | $b_{6,1}$ | $b_{6,2}$ | $b_{6,3}$ | $b_{6,4}$ | $b_{6,5}$ | $b_{6,6}$ | $b_{6,7}$ | $b_{6,8}$ | $b_{6,9}$ | $b_{6,10}$ | $b_{6,11}$ | $b_{6,12}$ | $b_{6,13}$ | $b_{6,14}$ | $b_{6,15}$ |
| $b_{7,0}$ | $b_{7,1}$ | $b_{7,2}$ | $b_{7,3}$ | $b_{7,4}$ | $b_{7,5}$ | $b_{7,6}$ | $b_{7,7}$ | $b_{7,8}$ | $b_{7,9}$ | $b_{7,10}$ | $b_{7,11}$ | $b_{7,12}$ | $b_{7,13}$ | $b_{7,14}$ | $b_{7,15}$ |
| $b_{8,0}$ | $b_{8,1}$ | $b_{8,2}$ | $b_{8,3}$ | $b_{8,4}$ | $b_{8,5}$ | $b_{8,6}$ | $b_{8,7}$ | $b_{8,8}$ | $b_{8,9}$ | $b_{8,10}$ | $b_{8,11}$ | $b_{8,12}$ | $b_{8,13}$ | $b_{8,14}$ | $b_{8,15}$ |
| $b_{9,0}$ | $b_{9,1}$ | $b_{9,2}$ | $b_{9,3}$ | $b_{9,4}$ | $b_{9,5}$ | $b_{9,6}$ | $b_{9,7}$ | $b_{9,8}$ | $b_{9,9}$ | $b_{9,10}$ | $b_{9,11}$ | $b_{9,12}$ | $b_{9,13}$ | $b_{9,14}$ | $b_{9,15}$ |
| $b_{10,0}$ | $b_{10,1}$ | $b_{10,2}$ | $b_{10,3}$ | $b_{10,4}$ | $b_{10,5}$ | $b_{10,6}$ | $b_{10,7}$ | $b_{10,8}$ | $b_{10,9}$ | $b_{10,10}$ | $b_{10,11}$ | $b_{10,12}$ | $b_{10,13}$ | $b_{10,14}$ | $b_{10,15}$ |
| $b_{11,0}$ | $b_{11,1}$ | $b_{11,2}$ | $b_{11,3}$ | $b_{11,4}$ | $b_{11,5}$ | $b_{11,6}$ | $b_{11,7}$ | $b_{11,8}$ | $b_{11,9}$ | $b_{11,10}$ | $b_{11,11}$ | $b_{11,12}$ | $b_{11,13}$ | $b_{11,14}$ | $b_{11,15}$ |
| $b_{12,0}$ | $b_{12,1}$ | $b_{12,2}$ | $b_{12,3}$ | $b_{12,4}$ | $b_{12,5}$ | $b_{12,6}$ | $b_{12,7}$ | $b_{12,8}$ | $b_{12,9}$ | $b_{12,10}$ | $b_{12,11}$ | $b_{12,12}$ | $b_{12,13}$ | $b_{12,14}$ | $b_{12,15}$ |
| $b_{13,0}$ | $b_{13,1}$ | $b_{13,2}$ | $b_{13,3}$ | $b_{13,4}$ | $b_{13,5}$ | $b_{13,6}$ | $b_{13,7}$ | $b_{13,8}$ | $b_{13,9}$ | $b_{13,10}$ | $b_{13,11}$ | $b_{13,12}$ | $b_{13,13}$ | $b_{13,14}$ | $b_{13,15}$ |
| $b_{14,0}$ | $b_{14,1}$ | $b_{14,2}$ | $b_{14,3}$ | $b_{14,4}$ | $b_{14,5}$ | $b_{14,6}$ | $b_{14,7}$ | $b_{14,8}$ | $b_{14,9}$ | $b_{14,10}$ | $b_{14,11}$ | $b_{14,12}$ | $b_{14,13}$ | $b_{14,14}$ | $b_{14,15}$ |
| $b_{15,0}$ | $b_{15,1}$ | $b_{15,2}$ | $b_{15,3}$ | $b_{15,4}$ | $b_{15,5}$ | $b_{15,6}$ | $b_{15,7}$ | $b_{15,8}$ | $b_{15,9}$ | $b_{15,10}$ | $b_{15,11}$ | $b_{15,12}$ | $b_{15,13}$ | $b_{15,14}$ | $b_{15,15}$ |

FIG. 11C

| $r_{0,0}$ | $r_{0,1}$ | $r_{0,2}$ | $r_{0,3}$ | $r_{0,4}$ | $r_{0,5}$ | $r_{0,6}$ | $r_{0,7}$ | $r_{0,8}$ | $r_{0,9}$ | $r_{0,10}$ | $r_{0,11}$ | $r_{0,12}$ | $r_{0,13}$ | $r_{0,14}$ | $r_{0,15}$ |
|---|---|---|---|---|---|---|---|---|---|---|---|---|---|---|---|
| $r_{1,0}$ | $r_{1,1}$ | $r_{1,2}$ | $r_{1,3}$ | $r_{1,4}$ | $r_{1,5}$ | $r_{1,6}$ | $r_{1,7}$ | $r_{1,8}$ | $r_{1,9}$ | $r_{1,10}$ | $r_{1,11}$ | $r_{1,12}$ | $r_{1,13}$ | $r_{1,14}$ | $r_{1,15}$ |
| $r_{2,0}$ | $r_{2,1}$ | $r_{2,2}$ | $r_{2,3}$ | $r_{2,4}$ | $r_{2,5}$ | $r_{2,6}$ | $r_{2,7}$ | $r_{2,8}$ | $r_{2,9}$ | $r_{2,10}$ | $r_{2,11}$ | $r_{2,12}$ | $r_{2,13}$ | $r_{2,14}$ | $r_{2,15}$ |
| $r_{3,0}$ | $r_{3,1}$ | $r_{3,2}$ | $r_{3,3}$ | $r_{3,4}$ | $r_{3,5}$ | $r_{3,6}$ | $r_{3,7}$ | $r_{3,8}$ | $r_{3,9}$ | $r_{3,10}$ | $r_{3,11}$ | $r_{3,12}$ | $r_{3,13}$ | $r_{3,14}$ | $r_{3,15}$ |
| $r_{4,0}$ | $r_{4,1}$ | $r_{4,2}$ | $r_{4,3}$ | $r_{4,4}$ | $r_{4,5}$ | $r_{4,6}$ | $r_{4,7}$ | $r_{4,8}$ | $r_{4,9}$ | $r_{4,10}$ | $r_{4,11}$ | $r_{4,12}$ | $r_{4,13}$ | $r_{4,14}$ | $r_{4,15}$ |
| $r_{5,0}$ | $r_{5,1}$ | $r_{5,2}$ | $r_{5,3}$ | $r_{5,4}$ | $r_{5,5}$ | $r_{5,6}$ | $r_{5,7}$ | $r_{5,8}$ | $r_{5,9}$ | $r_{5,10}$ | $r_{5,11}$ | $r_{5,12}$ | $r_{5,13}$ | $r_{5,14}$ | $r_{5,15}$ |
| $r_{6,0}$ | $r_{6,1}$ | $r_{6,2}$ | $r_{6,3}$ | $r_{6,4}$ | $r_{6,5}$ | $r_{6,6}$ | $r_{6,7}$ | $r_{6,8}$ | $r_{6,9}$ | $r_{6,10}$ | $r_{6,11}$ | $r_{6,12}$ | $r_{6,13}$ | $r_{6,14}$ | $r_{6,15}$ |
| $r_{7,0}$ | $r_{7,1}$ | $r_{7,2}$ | $r_{7,3}$ | $r_{7,4}$ | $r_{7,5}$ | $r_{7,6}$ | $r_{7,7}$ | $r_{7,8}$ | $r_{7,9}$ | $r_{7,10}$ | $r_{7,11}$ | $r_{7,12}$ | $r_{7,13}$ | $r_{7,14}$ | $r_{7,15}$ |
| $r_{8,0}$ | $r_{8,1}$ | $r_{8,2}$ | $r_{8,3}$ | $r_{8,4}$ | $r_{8,5}$ | $r_{8,6}$ | $r_{8,7}$ | $r_{8,8}$ | $r_{8,9}$ | $r_{8,10}$ | $r_{8,11}$ | $r_{8,12}$ | $r_{8,13}$ | $r_{8,14}$ | $r_{8,15}$ |
| $r_{9,0}$ | $r_{9,1}$ | $r_{9,2}$ | $r_{9,3}$ | $r_{9,4}$ | $r_{9,5}$ | $r_{9,6}$ | $r_{9,7}$ | $r_{9,8}$ | $r_{9,9}$ | $r_{9,10}$ | $r_{9,11}$ | $r_{9,12}$ | $r_{9,13}$ | $r_{9,14}$ | $r_{9,15}$ |
| $r_{10,0}$ | $r_{10,1}$ | $r_{10,2}$ | $r_{10,3}$ | $r_{10,4}$ | $r_{10,5}$ | $r_{10,6}$ | $r_{10,7}$ | $r_{10,8}$ | $r_{10,9}$ | $r_{10,10}$ | $r_{10,11}$ | $r_{10,12}$ | $r_{10,13}$ | $r_{10,14}$ | $r_{10,15}$ |
| $r_{11,0}$ | $r_{11,1}$ | $r_{11,2}$ | $r_{11,3}$ | $r_{11,4}$ | $r_{11,5}$ | $r_{11,6}$ | $r_{11,7}$ | $r_{11,8}$ | $r_{11,9}$ | $r_{11,10}$ | $r_{11,11}$ | $r_{11,12}$ | $r_{11,13}$ | $r_{11,14}$ | $r_{11,15}$ |
| $r_{12,0}$ | $r_{12,1}$ | $r_{12,2}$ | $r_{12,3}$ | $r_{12,4}$ | $r_{12,5}$ | $r_{12,6}$ | $r_{12,7}$ | $r_{12,8}$ | $r_{12,9}$ | $r_{12,10}$ | $r_{12,11}$ | $r_{12,12}$ | $r_{12,13}$ | $r_{12,14}$ | $r_{12,15}$ |
| $r_{13,0}$ | $r_{13,1}$ | $r_{13,2}$ | $r_{13,3}$ | $r_{13,4}$ | $r_{13,5}$ | $r_{13,6}$ | $r_{13,7}$ | $r_{13,8}$ | $r_{13,9}$ | $r_{13,10}$ | $r_{13,11}$ | $r_{13,12}$ | $r_{13,13}$ | $r_{13,14}$ | $r_{13,15}$ |
| $r_{14,0}$ | $r_{14,1}$ | $r_{14,2}$ | $r_{14,3}$ | $r_{14,4}$ | $r_{14,5}$ | $r_{14,6}$ | $r_{14,7}$ | $r_{14,8}$ | $r_{14,9}$ | $r_{14,10}$ | $r_{14,11}$ | $r_{14,12}$ | $r_{14,13}$ | $r_{14,14}$ | $r_{14,15}$ |
| $r_{15,0}$ | $r_{15,1}$ | $r_{15,2}$ | $r_{15,3}$ | $r_{15,4}$ | $r_{15,5}$ | $r_{15,6}$ | $r_{15,7}$ | $r_{15,8}$ | $r_{15,9}$ | $r_{15,10}$ | $r_{15,11}$ | $r_{15,12}$ | $r_{15,13}$ | $r_{15,14}$ | $r_{15,15}$ |

IMAGE ENCODING/DECODING METHOD AND APPARATUS

CROSS-REFERENCE TO RELATED PATENT APPLICATIONS

This application claims priority from U.S. Provisional Application Nos. 60/784,756 and 60/786,723, filed on Mar. 23, 2006 and Mar. 29, 2006, respectively, in the U.S. Patent and Trademark Office, and Korean Patent Application No. 10-2006-0061926, filed on Jul. 3, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to image encoding and decoding, and more particularly, to predicting one of a plurality of color component images of an image from a different color component image using a correlation between the color component images, thereby improving encoding efficiency.

2. Description of the Related Art

In general, when an image is captured, the captured original image is in a red, green, and blue (RGB) color format. To encode the RGB color format image, the RGB color format image is transformed into a YUV (or YCbCr) color format. Y is a black-white image and has a luminance component, and U (or Cb) and V (or Cr) have color components. Information is uniformly distributed over R, G, and B in an RGB image, but information is concentrated in Y and the amount of information in U (or Cb) and V (or Cr) is relatively small in a YUV (or YCbCr) image. Thus, the YUV (or YCbCr) image can be compressed with high compression efficiency. To further improve compression efficiency, an YUV (or YCbCr) 4:2:0 image obtained by sampling color components U (or Cb) and V (or Cr) of an YUV (or YCbCr) image at a ratio of 1:4 is generally used.

However, since ¼ sampling of U (or Cb) and V (or Cr) in the YUV (or YCbCr) 4:2:0 image causes color distortion, it is not suitable for providing high display quality. Thus, a method for effectively encoding a YUV (or YCbCr) 4:4:4 image with out sampling U (or Cb) and V (or Cr) is required. Recently, residual color transform (RCT) which directly encodes an RGB 4:4:4 image to remove color distortion occurring in transformation of an RGB image to a YUV (or YCbCr) image has been suggested.

When an image, such as a YUV (or YCbCr) 4:4:4 image or an RGB 4:4:4 image, in which color components have the same resolution is directly encoded using a related art encoding method, encoding efficiency is degraded. Thus, a method for improving encoding efficiency while maintaining high display quality by prediction based on the statistical characteristics of an image is required for a case where a YUV (or YCbCr) 4:4:4 image is encoded or where an RGB image is encoded in an RGB domain with out being transformed to a YUV (or YCbCr) format.

SUMMARY OF THE INVENTION

The present invention provides an image encoding/decoding method and apparatus, in which one of a plurality of red (R), green (G), and blue (B) color component images of an image is predicted from a different color component image using a correlation between the R, G, and B color component images, with out transforming the input RGB color format image to a different color format, thereby improving encoding efficiency.

According to an aspect of the present invention, there is provided an image encoding method comprising: performing intra prediction on a pixel block having a predetermined size of a first color component image of an input image including at least two color component images, to generate a prediction pixel block of the first color component image; reconstructing the prediction pixel block of the first color component image; and predicting a pixel block of a second color component image using the reconstructed pixel block of the first color component image, to generate a prediction pixel block of the second color component image.

According to another aspect of the present invention, there is provided an image encoding method comprising: performing intra prediction on a pixel block having a predetermined size of a first color component image of an input image including at least two color component images, to generate a prediction pixel block of the first color component image; reconstructing the prediction pixel block of the first color component image; detecting an edge in the reconstructed pixel block of the first color component image; dividing the pixel block of the first color component image and a corresponding pixel block of a second color component image into areas using the detected edge; and predicting pixel values in each of the areas of the pixel block of the second color component image using the reconstructed pixel block of the first color component image.

According to another aspect of the present invention, there is provided an image encoding apparatus comprising: an intra prediction unit which performs intra prediction on a pixel block having a predetermined size of a first color component image of an input image including at least two color component images, to generate a prediction pixel block of the first color component image; a reconstruction unit which reconstructs the prediction pixel block of the first color component image; and a correlation prediction unit which predicts a pixel block of a second color component image using the reconstructed pixel block of the first color component image, and generates a prediction pixel block of the second color component image.

According to another aspect of the present invention, there is provided an image encoding apparatus comprising: an intra prediction unit which performs intra prediction on a pixel block having a predetermined size of a first color component image of an input image including at least two color component images, to generate a prediction pixel block of the first color component image; a reconstruction unit which reconstructs the prediction pixel block of the first color component image; an edge detection unit which detects an edge in the reconstructed pixel block of the first color component image; an area division unit which divides the pixel block of the first color component image and a corresponding pixel block of a second color component image into areas using the detected edge; and a correlation prediction unit which predicts pixel values in each of the areas of the pixel block of the second color component image using the reconstructed pixel block of the first color component image.

According to another aspect of the present invention, there is provided an image decoding method comprising: receiving a bitstream of an encoded image including at least two color component images; decoding a pixel block having a predetermined size of a first color component image among the color component images; and decoding a pixel block of a second color component image using the decoded pixel bock of the first color component image.

According to another aspect of the present invention, there is provided an image decoding method comprising: receiving a bitstream of an encoded image including at least two color component images; decoding a pixel block having a predetermined size of a first color component image among the color component images; detecting an edge in the decoded pixel block of the first color component image; dividing the decoded pixel block of the first color component image and a corresponding pixel block of a second color component image into areas using the detected edge; and decoding the pixel block of the second color component image by predicting pixel values in each of the areas of the pixel block of the second color component image using the decoded pixel block of the first color component image.

According to another aspect of the present invention, there is provided an image decoding apparatus comprising: a decoding unit which receives a bitstream of an encoded image including at least two color component images, decodes a pixel block having a predetermined size of a first color component image among the color component images by intra prediction, and outputs the decoded pixel block of the first color component image; and a correlation prediction unit which decodes a corresponding pixel block of a second color component image using the decoded pixel block of the first color component image.

According to another aspect of the present invention, there is provided an image decoding apparatus comprising: a decoding unit which receives a bitstream of an encoded image including at least two color component images, decodes a pixel block having a predetermined size of a first color component image among the color component images by intra prediction, and outputs the decoded pixel block of the first color component image; an edge detection unit which detects an edge in the decoded pixel block of the first color component image; an area division unit which divides the decoded pixel block of the first color component image and a corresponding pixel block of a second color component image into areas using the detected edge; and a correlation prediction unit which decodes the pixel block of the second color component image by predicting pixel values in each of the areas of the pixel block of the second color component image using the decoded pixel block of the first color component image.

BRIEF DESCRIPTION OF THE DRAWINGS

The above and other aspects of the present invention will become more apparent by describing in detail exemplary embodiments thereof with reference to the attached drawings in which:

FIG. 7A illustrates a 16×16 pixel block of a G color component image included in an input image;

FIG. 7B illustrates a 16×16 pixel block of a B color component image included in the input image;

FIG. 7C illustrates a 16×16 pixel block of a R color component image included in the input image;

FIG. 11A illustrates an example in which a pixel block of a G color component image is divided using an edge detected by an area division unit illustrated in FIG. 9;

FIG. 11B illustrates an example in which a pixel block of a B color component image is divided using an edge detected by the area division unit illustrated in FIG. 9;

FIG. 11C illustrates an example in which a pixel block of a R color component image is divided using an edge detected by the area division unit illustrated in FIG. 9;

DETAILED DESCRIPTION OF EXEMPLARY EMBODIMENTS OF THE INVENTION

Hereinafter, exemplary embodiments of the present invention will be described in detail with reference to the accompanying drawings.

Figure 1A:
FIGS. 1A, 1B and 1C illustrate an R color component image, a G color component image, and a B color component image of a single color image, respectively.
Figure 1B:
Figure 1C:
Figure 2A:
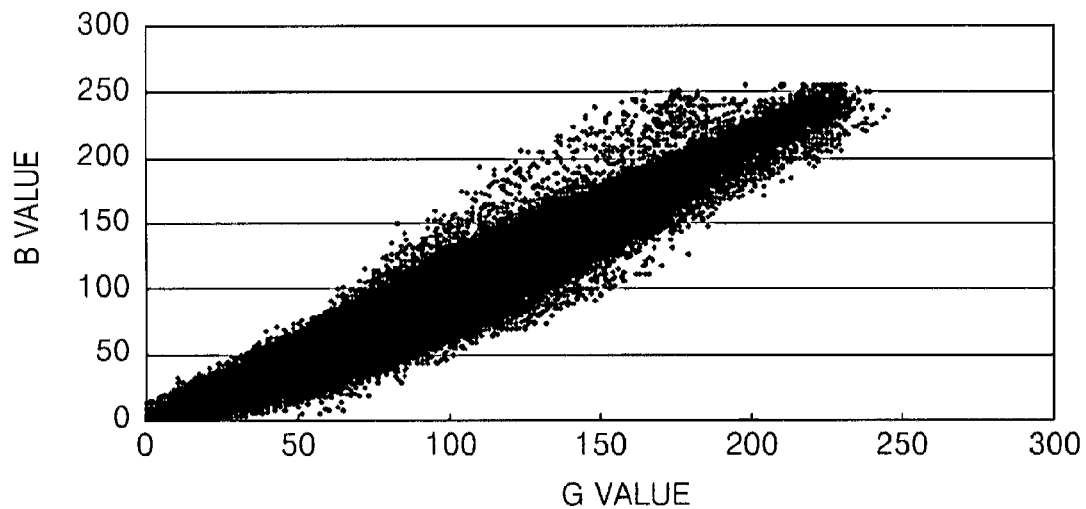
FIG. 2A is a graph showing a correlation between the G color component image of FIG. 1B and the B color component image of FIG. 1C.
Figure 2B:
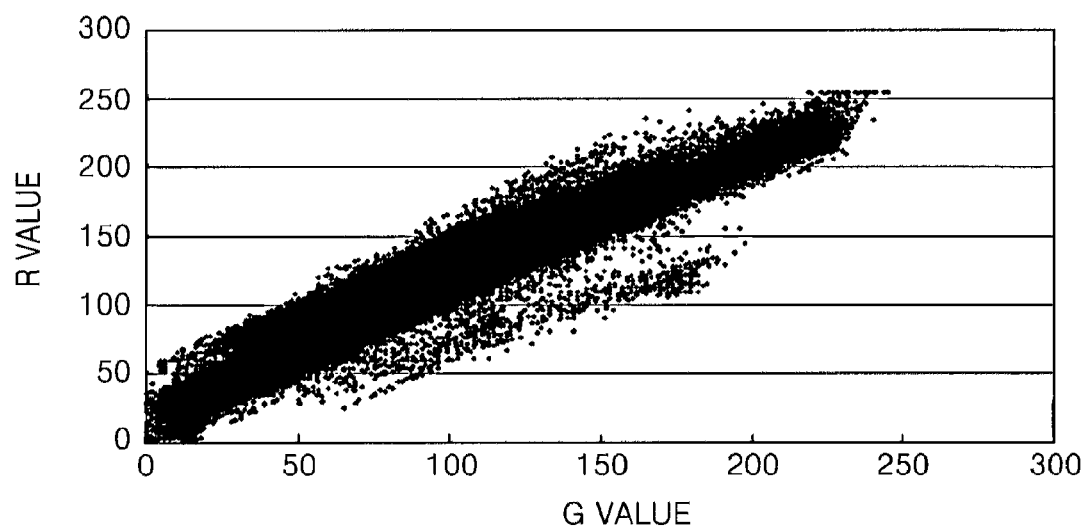
FIG. 2B is a graph showing a correlation between the R color component image of FIG. 1A and the G color component image of FIG. 1B.

FIGS. 1A through 1C illustrate an R color component image, a G color component image, and a B color component image of a single color image, respectively. FIG. 2A is a graph showing a correlation between the G color component image of FIG. 1B and the B color component image of FIG. 1C, and FIG. 2B is a graph showing a correlation between the R color component image of FIG. 1A and the G color component image of FIG. 1B.

In general, when a color image is encoded, predictive encoding is performed on each of color component images to remove redundant information in each of color components. Referring to FIGS. 1A through 1C, pixels of RGB color component images of a single color image at the same position have similar pixel values, which can also be seen from graphs illustrated in FIGS. 2A and 2B.

Thus, according to an exemplary embodiment of the present invention, a first color component image selected from a plurality of color component images of an image is encoded according to intra predictive-encoding, and the remaining color component images are predicted from a reconstructed first color component image based on a correlation between the color component images. For example, in an image encoding method and apparatus according to an exemplary embodiment of the present invention, if an image includes three R, G, and B color components, a G color component image is first intra predictive-encoded, a corresponding R color component image is predicted from a reconstructed G color component image, and the remaining B color component image is predicted from the reconstructed G color component image or a reconstructed R color component image. In this example, the encoding order of the color component images may vary.

Figure 3:
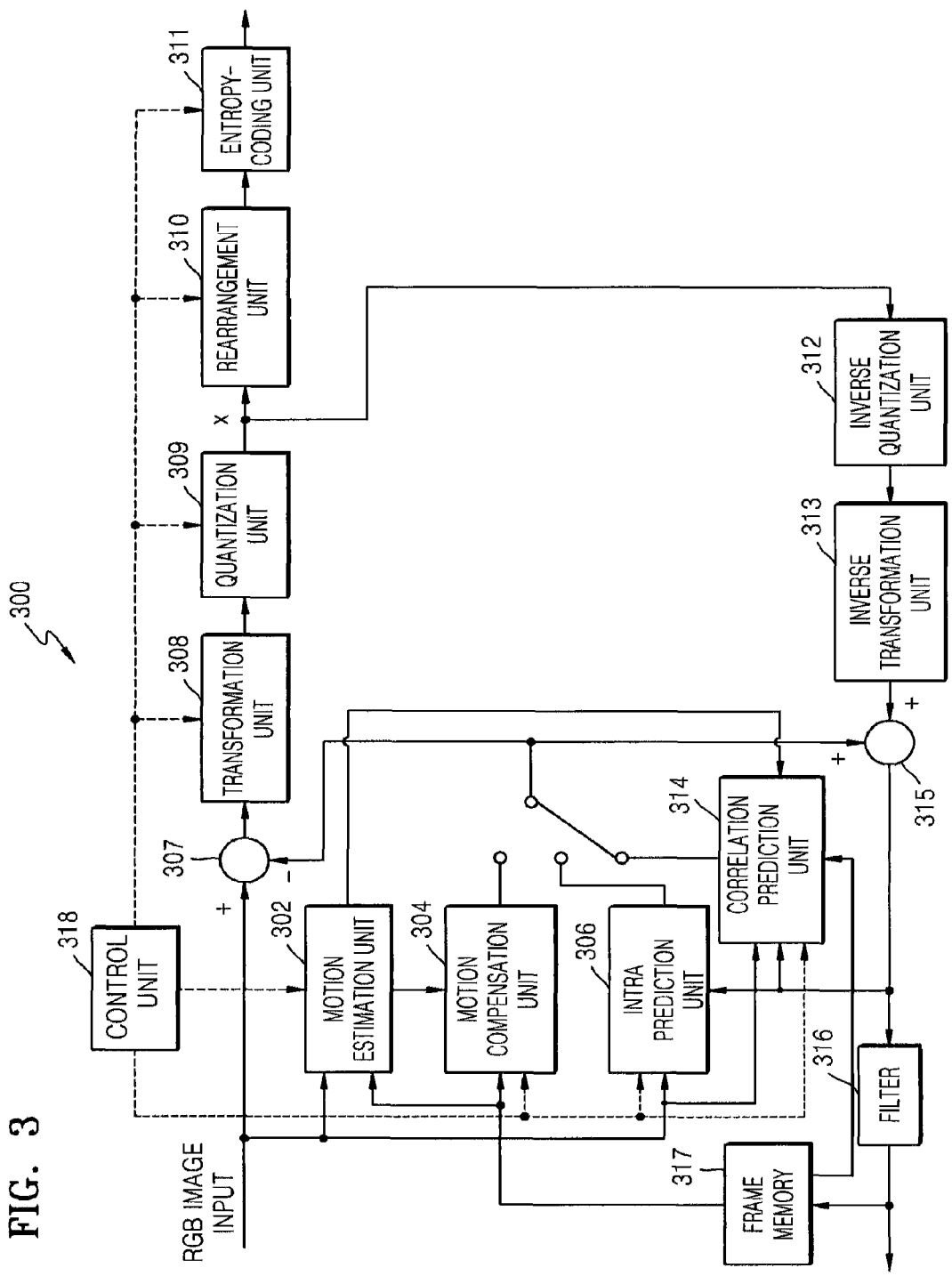
FIG. 3 is a block diagram of an image encoding apparatus according to an exemplary embodiment of the present invention.

FIG. 3 is a block diagram of an image encoding apparatus according to an exemplary embodiment of the present invention. Although the present invention is described with reference to an image encoding apparatus complying with H.264 for the convenience of explanation, the present invention may also be applied to other image encoding apparatuses performing residue coding.

Referring to FIG. 3, the image encoding apparatus 300 includes a motion estimation unit 302, a motion compensation unit 304, an intra prediction unit 306, a subtraction unit 307, a transformation unit 308, a quantization unit 309, a rearrangement unit 310, an entropy-coding unit 311, an inverse quantization unit 312, an inverse transformation unit 313, a correlation prediction unit 314, an addition unit 315, a filter 316, a frame memory 317, and a control unit 318.

The motion estimation unit 302 and the motion compensation unit 304 perform inter prediction in which a prediction value of the current pixel block is searched for in a preceding or following reference picture.

Figure 4:
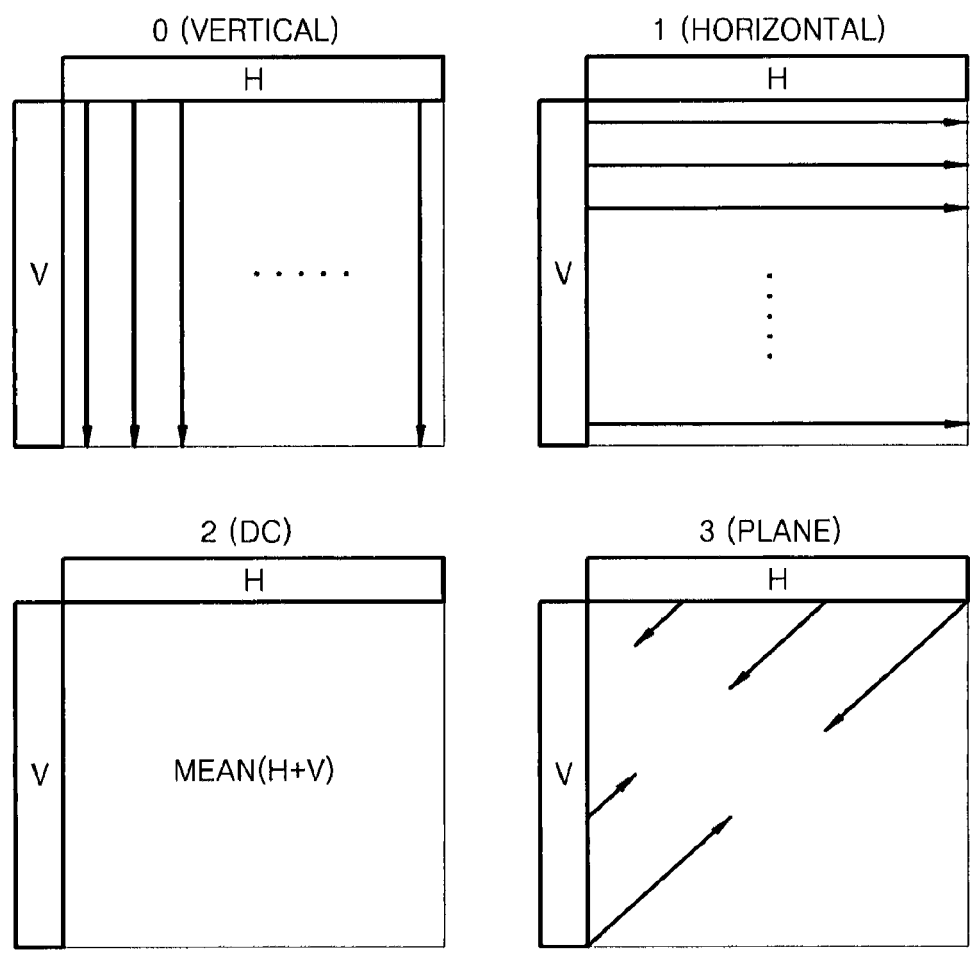
FIG. 4 illustrates a 16×16 intra prediction mode according to H.264.
Figure 5:
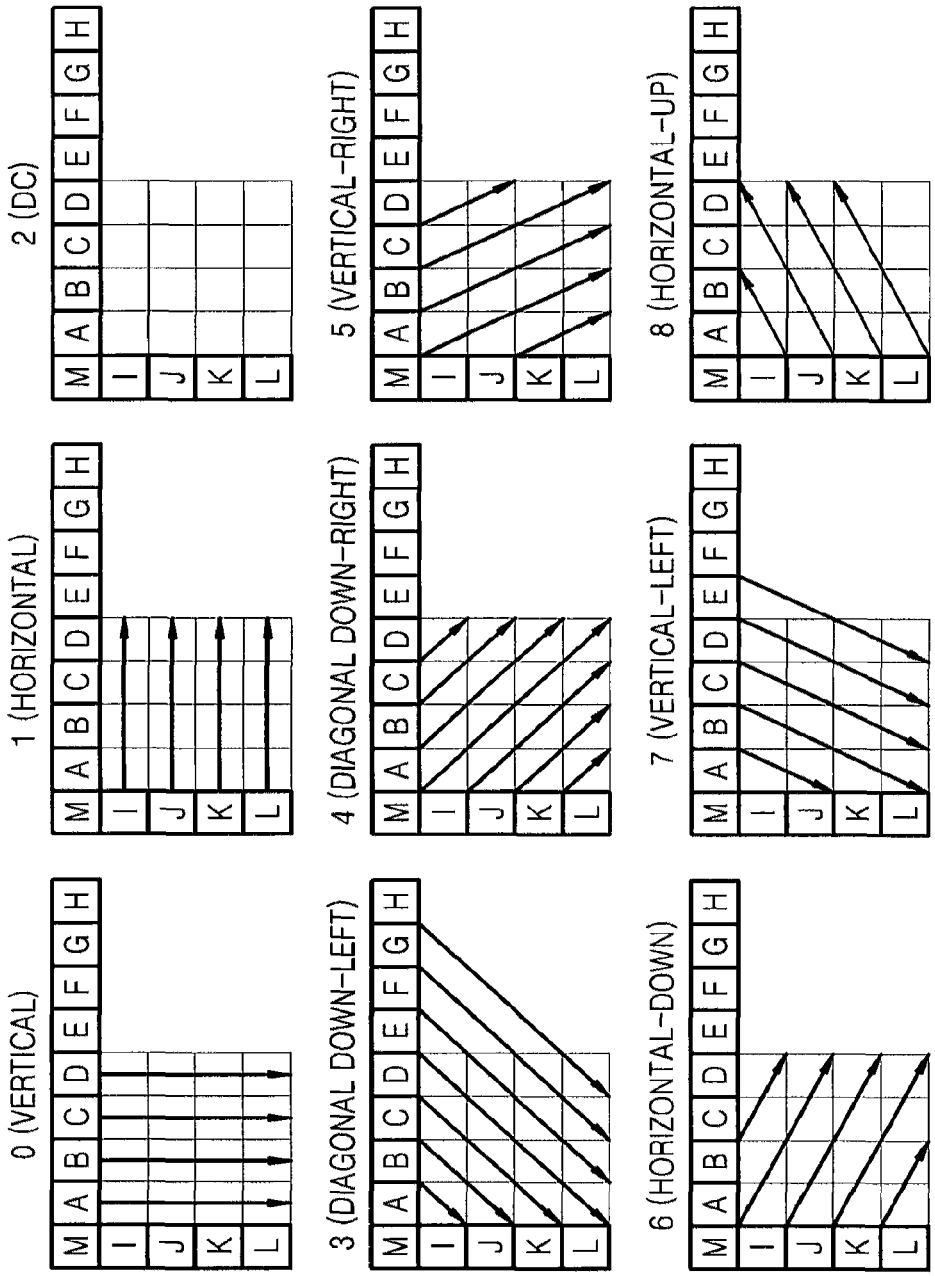
FIG. 5 illustrates a 4×4 intra prediction mode according to H.264.

FIG. 4 illustrates a 16×16 intra prediction mode according to the H.264 standard, and FIG. 5 illustrates a 4×4 intra prediction mode according to the H.264 standard.

The intra prediction unit 306 performs intra prediction in which the prediction value of the current pixel block is searched for in the current picture. In particular, the intra prediction unit 306 selects a first color component image from input R, G, and B color component images and divides the selected first color component image into pixel blocks having a predetermined size. The intra prediction unit 306 performs intra prediction on the pixel blocks of the first color component image in the 16×16 intra prediction mode as illustrated in FIG. 4, the 4×4 intra prediction mode as illustrated in FIG. 5, or an 8×8 intra prediction mode (similar to the 4×4 intra prediction mode) according to the side of the pixel blocks. For example, when the selected first color component image is a G color component image, the intra prediction unit 306 performs intra prediction on the pixel blocks of the G color component image, which have a predetermined size, using reconstructed pixel values of the neighboring pixel blocks, which are previously processed, of the G color component image. Here, the intra prediction unit 306 may perform intra prediction on the pixel blocks of the first color component image using other modified intra prediction methods, in addition to the intra prediction method according to the H.264 standard.

The subtraction unit 307 generates a first residue by subtracting a prediction pixel block, which is predicted by inter prediction or intra prediction, from an original pixel block of the input first color component image. The generated first residue is transformed into a frequency domain by the transformation unit 308 and is quantized by the quantization unit 309. Transformation coefficients of the quantized first residue are rearranged by the rearrangement unit 310, encoded by the entropy-coding unit 314, and output in the form of a bitstream.

The transformed and quantized first residue is inversely quantized by the inverse quantization unit 312, and inversely transformed by the inverse transformation unit 313. The addition unit 315 adds the inversely quantized and inversely transformed first residue to the prediction pixel block of the first color component image, thereby reconstructing the pixel block of the first color component image. The reconstructed first color component image passes through the filter 316, which performs deblocking filtering, and is stored in the frame memory 317 to be used for inter prediction of a next picture. The reconstructed pixel block of the first color component image is input to the intra prediction unit 306 to be used as a reference for intra prediction of a next pixel block. The reconstructed pixel block of the first color component image is also input to the correlation prediction unit 314 for prediction of pixel blocks of the other color component images except for the first color component image.

The correlation prediction unit 314 predicts corresponding pixel blocks of the remaining color component images from a pixel block of the reconstructed first color component image using a correlation between the color component images forming a color image. Referring back to FIGS. 2A and 2B, pixel values of the color component images of the color image have a correlation with one another and can be linearly modeled as a first-order function. The correlation prediction unit 314 predicts pixel values of different color component images at the same position using a predictor generated by linear modeling and using the pixel value of the reconstructed pixel block having a predetermined size of the first color component image as a parameter. The linear modeling process for predicting the pixel blocks of the other color component images from the reconstructed pixel block of the first color component image will be described later.

When the correlation prediction unit 314 predictive-encodes an input image including at least three color components as in an RGB color image, the correlation prediction unit 314 may predict the pixel blocks of both a second color component image and a third color component image using the reconstructed pixel block of the first color component image. Alternatively, the correlation prediction unit 314 may predict a pixel block of the second color component image from the reconstructed pixel block of the first color component image and predict a pixel block of the third color component image from the reconstructed pixel block of the second color component image. In other words, the correlation prediction unit 314 may predict the pixel blocks of all of the other color component images from the reconstructed pixel block of the first color component image, or may predict a pixel block of a color component image from a reconstructed pixel block of another color component image predicted from the reconstructed pixel block of the first color component image.

The subtraction unit 307 subtracts pixel blocks of the original second and third color component images from the pixel blocks of the second and third color component images predicted by the correlation prediction unit 314, thereby generating a second residue and a third residue. Like the first residue, the second residue and the third residue are encoded through transformation, quantization, and entropy-coding, and are output in the form of a bitstream.

The transformed and quantized second residue and third residue are inversely quantized by the inverse quantization unit 312 and inversely transformed by the inverse transformation unit 313, and the addition unit 315 adds the inversely quantized and inversely transformed second residue and third residue to the pixel blocks of the second and third color component images predicted by the correlation prediction unit 314, thereby reconstructing pixel blocks of the second and third color component images. The reconstructed second and third color component images pass through the filter 316 that performs deblocking filtering and are stored in the frame memory 317 to be used for inter prediction of a next picture. As described above, when predicting a pixel block of the third color component image from the reconstructed pixel block of the second color component image, the reconstructed pixel block of the second color component image is input from the addition unit 315 to the correlation prediction unit 314.

The control unit 318 controls each of the elements of the image encoding apparatus 300 and determines a prediction mode for the current pixel block. More specifically, the control unit 318 calculates the costs of an inter predicted image, an intra predicted image, and an image predicted using a correlation between color component images according to an exemplary embodiment of the present invention, and determines a prediction mode having the lowest cost as a final prediction mode. The control unit 318 may select conventional inter prediction or intra prediction for encoding each of the color component images instead of the predictive encoding according to an exemplary embodiment of the present invention, when the cost of a predicted image according to the exemplary embodiment of the present invention is higher than a predetermined threshold.

The control unit 318 also calculates a reference value indicating a correlation between color component images as illustrated in FIGS. 2A and 2B, and may select conventional inter prediction or intra prediction for encoding each of the color component images instead of the predictive encoding according to the exemplary embodiment of the present invention if the reference value is less than a predetermined threshold. Here, the reference value may be a dispersion value or a standard deviation indicating the degree of dispersion between color component images.

Prediction mode information is inserted into a header of a bitstream of an image encoded by an image encoding method according to an exemplary embodiment of the present invention to perform decoding based on a correlation between color component images according to an exemplary embodiment of the present invention.

Figure 6:
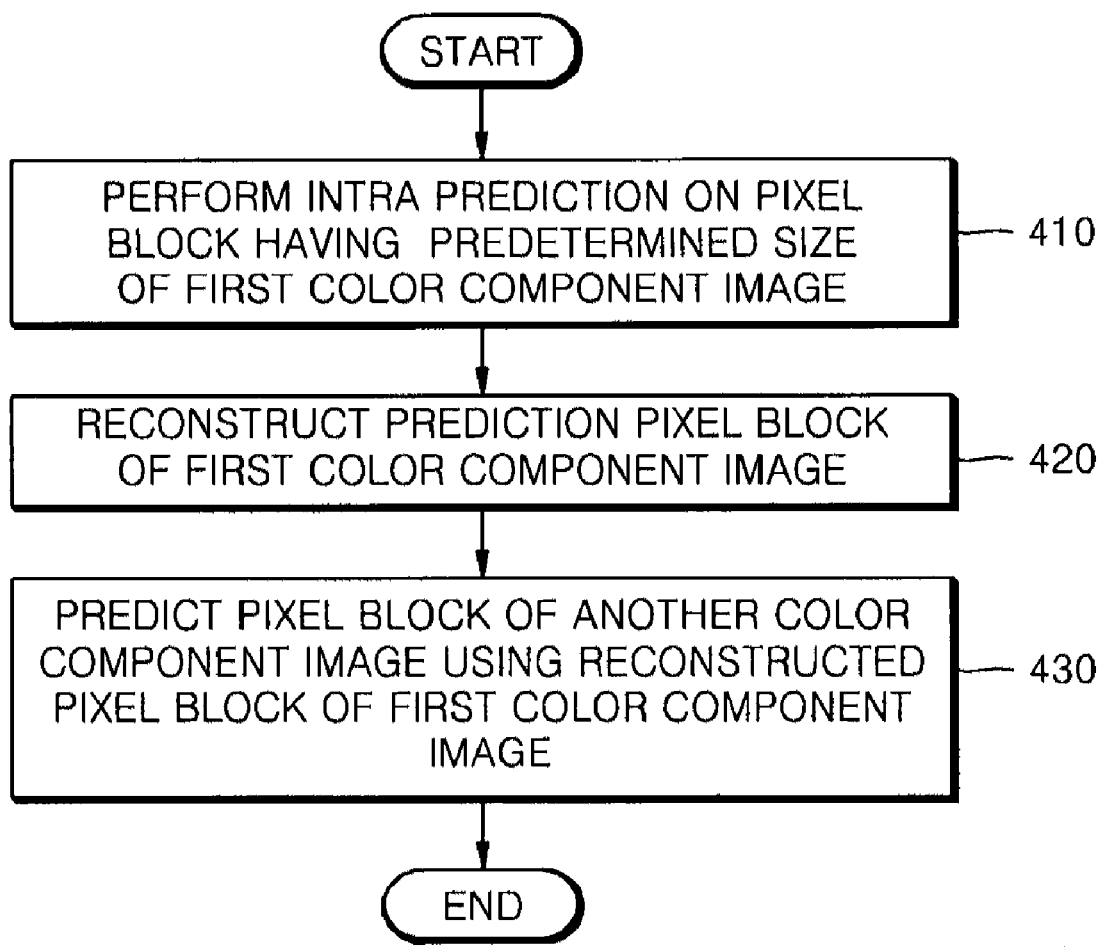
FIG. 6 is a flowchart illustrating an image encoding method according to an exemplary embodiment of the present invention.

FIG. 6 is a flowchart illustrating an image encoding method according to an exemplary embodiment of the present invention. Hereinafter, the operation of the image encoding apparatus 300 and the image encoding method according to an exemplary embodiment of the present invention will be described with reference to FIG. 3.

In operation 410, the intra prediction unit 306 performs intra prediction on a pixel block having a predetermined size of a first color component image selected from among a plurality of color component images of an input image.

FIG. 7A illustrates a 16×16 pixel block 710 of a G color component image included in the input image, FIG. 7B illustrates a 16×16 pixel block 720 of a B color component image included in the input image, and FIG. 7C illustrates a 16×16 pixel block 730 of an R color component image included in the input image. $g_{i,j}$, $b_{i,j}$, and $r_{i,j}$ indicate a pixel value in an $i^{th}$ row and a $j^{th}$ column of the 16×16 pixel block of each of the G, B, and R color component images.

When the G color component image, the B component image, and the R color component image are sequentially encoded, the intra prediction unit 306 generates a prediction pixel block by performing intra prediction on the 16×16 pixel block 710 of the G color component image according to the image encoding method of FIG. 6 using the previously processed pixel values of neighboring pixel blocks.

The subtraction unit 307 calculates a first residue by calculating a difference between the 16×16 prediction pixel block of the G color component image and the original 16×16 pixel block of the G color component image. The generated first residue passes through the transformation unit 308, the quantization unit 309, and the entropy-encoding unit 311, and is then output as a bitstream.

In operation 420, inverse quantization and inverse transformation are performed on the first residue, and the inversely quantized and inversely transformed first residue is added to the 16×16 prediction pixel block of the G color component image, which is obtained by intra prediction, in order to reconstruct the original 16×16 pixel block of the G color component image.

In operation 430, the correlation prediction unit 314 predicts pixel values of a 16×16 pixel block 720 of the B color component image and pixel values of a 16×16 pixel block 730 of the R color component image at corresponding positions using pixel values of the reconstructed 16×16 pixel block of the G color component image.

In particular, assuming that $g'_{i,j}$ denotes a pixel value of a pixel in an $i^{th}$ row and a $j^{th}$ column of the reconstructed 16×16 pixel block of the G color component image, $\overline{b_{i,j}}$, which corresponds to $g'_{i,j}$, denotes a prediction pixel value in an $i^{th}$ row and a $j^{th}$ column of a pixel block of the B color component image, a denotes a predetermined weight indicating a correlation between the G color component image and the B color component image, and b denotes a predetermined offset value, the correlation prediction unit 314 models the correlation between the pixel values of the G color component image and the B color component image using a first-order model as in Equation 1 and predicts pixel values of the B color component image, which correspond to the pixel values of the G color component image.

$$\overline{b_{i,j}} = a \times g'_{i,j} + b \tag{1}$$

Prediction pixel values obtained using Equation 1 are clipped to integers between 0 and 255 when each pixel value of the image is expressed in 8 bits. In Equation 1, a and b may change according to the position (i, j) of the pixel, but they are assumed to be constant within a predetermined block in the current exemplary embodiment of the present invention. For example, a and b may be determined as values that minimize the sum of differences, Sum of diff($r_B$), between the original pixel values $b_{i,j}$ of the 16×16 pixel block 720 of the B color component image and corresponding prediction pixel values of the B color component image predicted using Equation 1 as expressed in Equation 2.

$$\text{Sum of diff}(r_B) = \sum_{i,j=0}^{15} |b_{i,j} - (a \cdot g'_{i,j} + b)|^p \tag{2}$$

In Equation 2, p is an integer of 1 or greater. According to a method of determining a and b in Equation 2, a may be determined as 1, and b may be determined as the average of differences between the original pixel values $b_{i,j}$ of the 16×16 pixel block 720 of the B color component image and the reconstructed pixel values $g'_{i,j}$ of a corresponding pixel block of the G color component image as expressed in Equation 3.

$$b = \frac{\sum_{i=0}^{15}\sum_{j=0}^{15}(b_{i,j} - g'_{i,j})}{256} \quad (3)$$

Once a and b in Equation 1 are determined, the correlation prediction unit 314 substitutes the pixel values $g'_{i,j}$ of the reconstructed pixel block of the G color component image into Equation 1 in order to predict the pixel values of a corresponding pixel block of the B color component image.

According to another method of determining a and b in Equation 1, a linear regression model based method that is widely used in the field of statistics may be used.

Figure 8A:
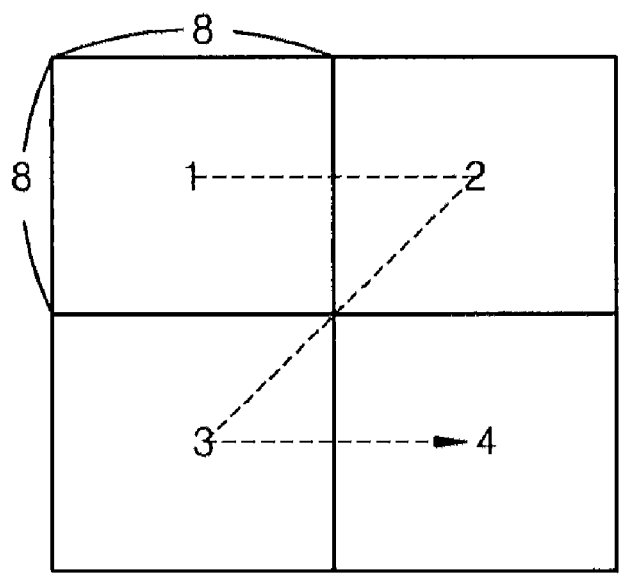
FIG. 8A illustrates the processing order of 8×8 pixel blocks in an image encoding method and apparatus according to an exemplary embodiment of the present invention.
Figure 8B:
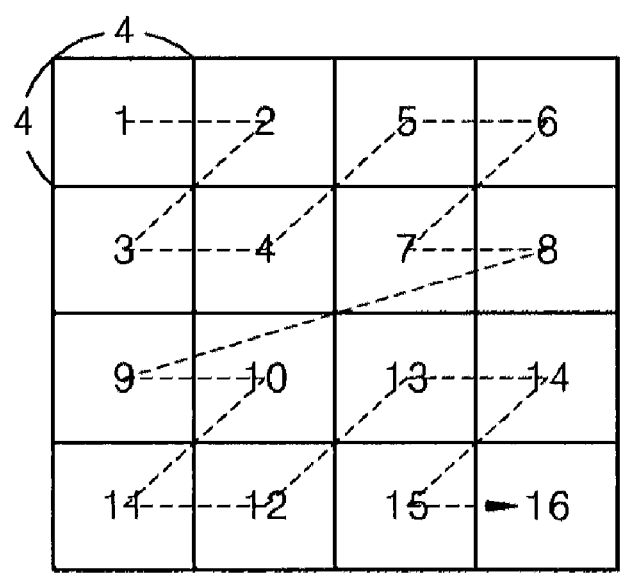
FIG. 8B illustrates the processing order of 4×4 pixel blocks in an image encoding method and apparatus according to an exemplary embodiment of the present invention.

FIG. 8A illustrates the processing order of 8×8 pixel blocks in an image encoding method and apparatus according to an exemplary embodiment of the present invention, and FIG. 8B illustrates the processing order of 4×4 pixel blocks in an image encoding method and apparatus according to an exemplary embodiment of the present invention.

Referring to FIG. 8A, when a pixel block of the B color component image is processed in an 8×8 mode, four 8×8 pixel blocks of the B color component image are sequentially predicted left-to-right and top-to-bottom. Pixel values of the 8×8 pixel blocks of the B color component image are predicted using Equation 1 in the similar manner to the above-described prediction of pixel values of the 16×16 pixel block 720 of the B color component image. In processing in the 8×8 mode, a and b of Equation 1 may be determined as values that minimize the sum of differences, Sum of diff($r_B$), between the original pixel values $b_{i,j}$ of the 8×8 pixel block of the B color component image and corresponding prediction pixel values of the B color component image. Alternatively, a may be determined as 1 and b may be determined as the average of differences between the original pixel values $b_{i,j}$ of the 8×8 pixel block of the B color component image and the reconstructed pixel values $g'_{i,j}$ of the 8×8 pixel block of the G color component image as expressed in Equation 4.

$$b = \frac{\sum_{i=0}^{7}\sum_{j=0}^{7}(b_{i,j} - g'_{i,j})}{64}. \quad (4)$$

Referring to FIG. 8B, when a pixel block of the B color component image is processed in a 4×4 mode, sixteen 4×4 pixel blocks of the B color component image are sequentially predicted left-to-right and top-to-bottom. Pixel values of the 4×4 pixel blocks of the B color component image can be predicted using Equation 1 in the similar manner to the above-described prediction of the pixel values of a 16×16 pixel block 720 or 8×8 pixel block of the B color component image. For example, a and b of Equation 1 may be determined as values that minimize the sum of differences, Sum of diff($r_B$), between the original pixel values $b_{i,j}$ of a 4×4 pixel block of the B color component image and corresponding prediction pixel values of the B color component image. Alternatively, a may be determined as 1 and b may be determined as the average of differences between the original pixel values $b_{i,j}$ of the 4×4 pixel block of the B color component image and the reconstructed pixel values $g'_{i,j}$ of a corresponding 4×4 neighbor pixel block of the G color component image as expressed in Equation 5.

$$b = \frac{\sum_{i=0}^{3}\sum_{j=0}^{3}(b_{i,j} - g'_{i,j})}{16} \quad (5)$$

As described above, correlation prediction for macroblock (16×16) may be performed in units of a 16×16 block, an 8×8 block, or a 4×4 block. As an adaptive example, correlation prediction for each macroblock may be performed in units of a block in one of the three block modes.

The subtraction unit 307 calculates a difference between an original pixel block of the B color component image and a prediction pixel block predicted by the correlation prediction unit 314 using the pixel values of the reconstructed pixel block of the G color component image, thereby generating a second residue. The generated second residue passes through the transformation unit 308, the quantization unit 309, and the entropy-encoding unit 311, and is output in the form of a bitstream.

Like the pixel values of the pixel block of the B color component image, pixel values of a pixel block of the R color component image can also be predicted using the pixel values of the reconstructed pixel block of the G color component image.

The correlation prediction unit 314 may predict the pixel values of the pixel block of the R color component image using the reconstructed pixel values of the pixel block of the previously processed B color component image instead of the pixel values of the reconstructed G color component image. In other words, the transformed and quantized value of the second residue that is a difference between the pixel block of the original B color component image and the prediction pixel block of the B color component image is inversely transformed and inversely quantized, and the pixel block of the B color component image reconstructed by adding the inversely transformed and inversely quantized second residue to the prediction pixel block of the B color component image may be used for prediction of the pixel block of the R color component image.

More specifically, assuming that $b'_{i,j}$ denotes a pixel value of a pixel in an $i^{th}$ row and a $j^{th}$ column of the reconstructed pixel block of the B color component image, $\overline{r_{i,j}}$, which corresponds to $b'_{i,j}$, denotes a prediction value of a pixel in an $i^{th}$ row and a $j^{th}$ column of a corresponding pixel block of the R color component image, c denotes a predetermined weight indicating a correlation between the B color component image and the R color component image, and d denotes a predetermined offset value, the correlation prediction unit 314 models a correlation between the pixel values of the B color component image and the pixel values of the R color component image using a first-order function as follows in Equation 6, thereby predicting pixel values of the R color component image, which correspond to the pixel values of the B color component image.

$$\overline{r_{i,j}} = c \times b'_{i,j} + d \quad (6)$$

As described above, prediction pixel values obtained using Equation 6 are clipped to integers between 0 and 255 when each pixel value of the image is expressed in 8 bits. In Equation 6, c and d may change according to the position (i, j) of the pixel, but they are assumed to be constant with in a predetermined block in the current exemplary embodiment of the present invention. For example, c and d may be determined as values that minimize the sum of differences, Sum of diff($r_R$), between the pixel values $r_{i,j}$ of an original pixel block of the R color component image and corresponding prediction pixel values of the R color component image predicted using Equation 6 as expressed in Equation 7.

$$\text{Sum of diff}(r_R) = \sum_{i,j=0}^{15} |r_{i,j} - (c \cdot b'_{i,j} + d)|^p \quad (7)$$

In Equation 7, p is an integer of 1 or greater. According to a method of determining c and d in Equation 7, c may be determined as 1, and d may be determined as the average of differences between the pixel values $r_{i,j}$ of an original 16×16 pixel block 730 of the R color component image and the pixel values $b'_{i,j}$ of the reconstructed pixel block of the B color component image as expressed in Equation 8.

$$d = \frac{\sum_{i=0}^{15}\sum_{j=0}^{15}(r_{i,j} - b'_{i,j})}{256} \quad (8)$$

Once the constants c and d of Equation 6 are determined, the correlation prediction unit 314 substitutes pixel values $b'_{i,j}$ of the reconstructed pixel block of the B color component image into Equation 6 in order to predict corresponding pixel values of the pixel block of the R color component image.

a and b of Equation 1 and c and d of Equation 6 may be inserted into a header of a generated bitstream as prediction mode information and transmitted to a decoding unit to be used for decoding.

Figure 9:
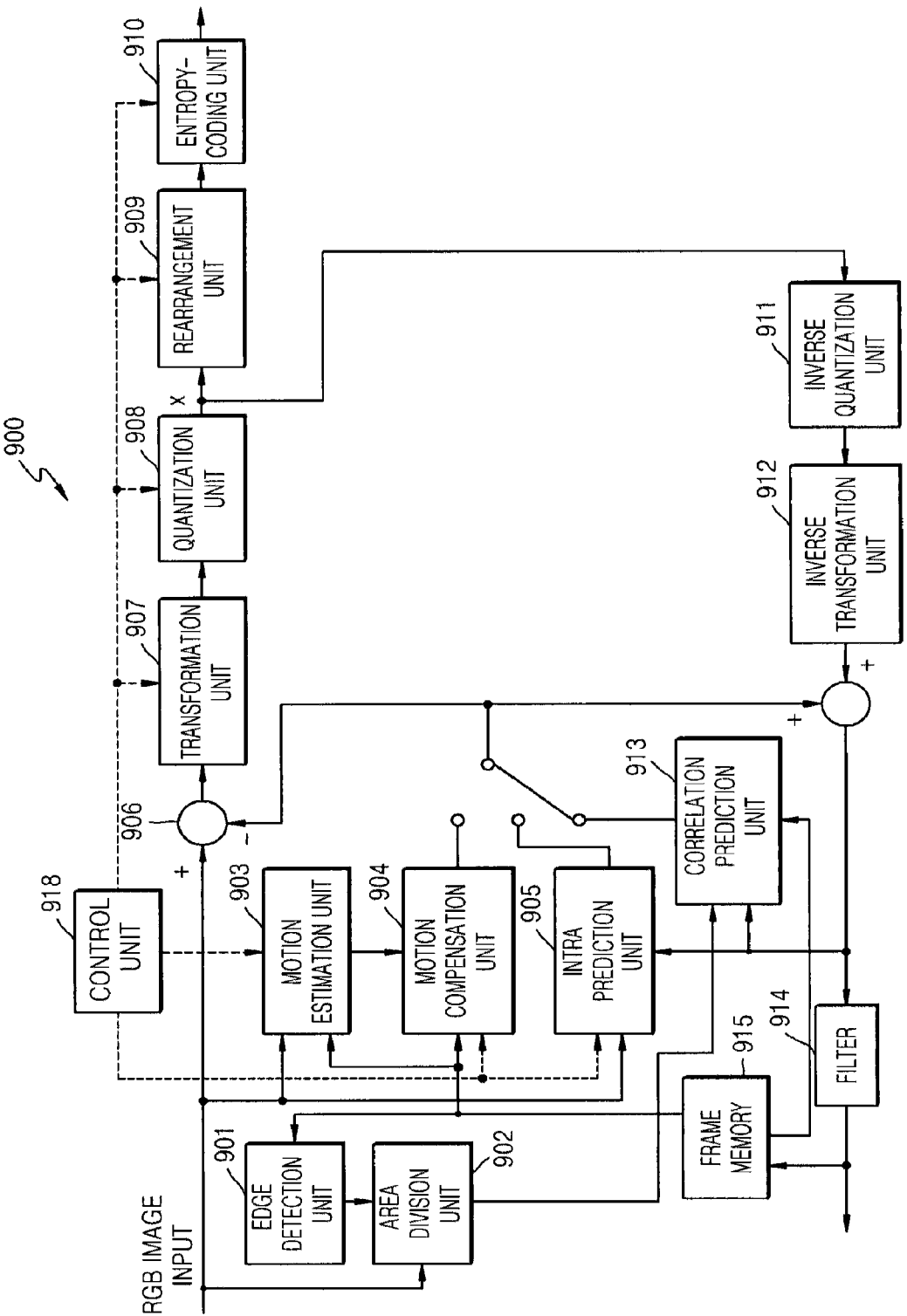
FIG. 9 is a block diagram of an image encoding apparatus according to another exemplary embodiment of the present invention.
Figure 10:
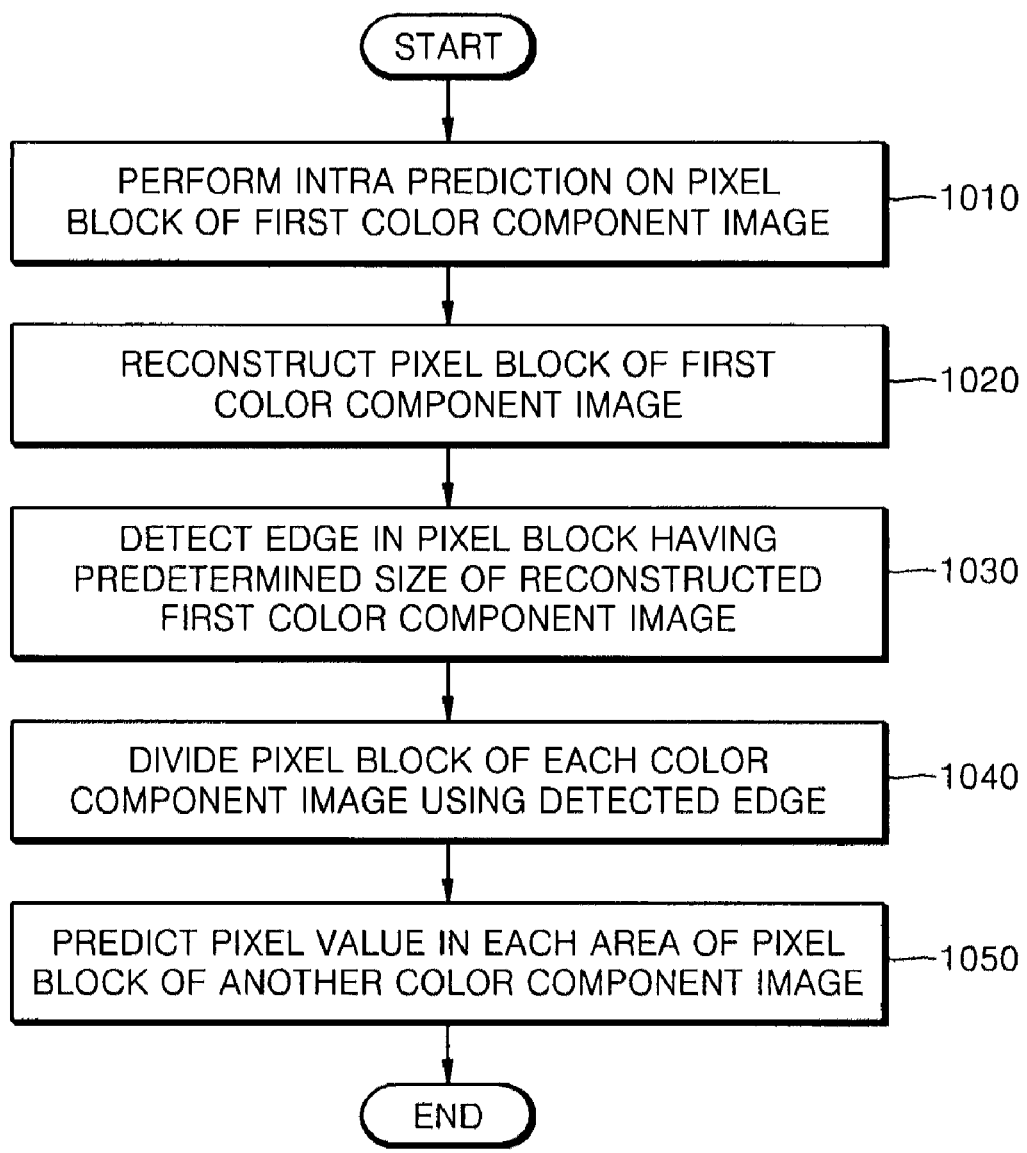
FIG. 10 is a flowchart illustrating an image encoding method according to another exemplary embodiment of the present invention.

FIG. 9 is a block diagram of an image encoding apparatus according to another exemplary embodiment of the present invention, and FIG. 10 is a flowchart illustrating an image encoding method according to another exemplary embodiment of the present invention.

The structure and operation of the image encoding apparatus 900 illustrated in FIG. 9 are similar to those of the image encoding apparatus 300 illustrated in FIG. 3, but the image encoding apparatus 900 further includes an edge detection unit 901 for detecting an edge in a reconstructed first color component image and an area division unit 902. In the following description, the same components of the image encoding apparatus 900 as those of the image encoding apparatus 300 will not be described and explanation of the image encoding apparatus 900 and the image encoding method according to another exemplary embodiment of the present invention will be focused on differences from the image encoding apparatus 300 according to the previous exemplary embodiment of the present invention.

In operation 1010, the intra prediction unit 905 performs intra prediction on a pixel block of the G (first) color component image in the same manner as in the previous exemplary embodiment of the present invention. A first residue that is a difference between a prediction pixel block of the G color component image and an original pixel block of the G color component image is encoded through a transformation unit 907, a quantization unit 908, and an entropy-encoding unit 910, and is output as a bitstream.

In operation 1020, inverse transformation and inverse quantization are performed on the transformed and quantized first residue, thereby reconstructing the first residue. The reconstructed first residue is added to the prediction pixel block of the G color component image, thereby reconstructing the pixel block of the G color component image.

In operation 1030, the edge detection unit 901 detects whether an edge exist in the reconstructed pixel block of predetermined size of the first color component image. This edge detection is performed because color characteristics may change between areas divided by an edge in a pixel block. Thus, in the current exemplary embodiment of the present invention, an edge in the pixel block is detected, the pixel block is divided into areas by the detected edge, and pixel values of a different color component image are predicted in each of the areas from pixel values of the reconstructed first color component image in a similar manner as in the previous exemplary embodiment of the present invention.

For edge detection, various edge detection algorithms, such as a sobel operator, a canny edge detection algorithm, etc., may be used. The direction of an intra prediction mode determined by the intra prediction unit 905 may be determined as an edge direction with out a need for the edge detection unit 901.

In operation 1040, the area division unit 902 divides the pixel block of the first color component image and corresponding pixel blocks of the remaining color component images using the detected edge.

FIG. 11A illustrates an example in which a pixel block of the G color component image is divided using a detected edge, FIG. 11B illustrates an example in which a pixel block of the B color component image is divided using a detected edge, and FIG. 11C illustrates an example in which a pixel block of the R color component image is divided using a detected edge. Referring to FIGS. 11A through 11C, if the edge detection unit 901 detects that an edge exists in the reconstructed pixel block of the G color component image, the area division unit 902 determines that the same edge exists in the pixel block of the B color component image and the pixel block of the R color component image and divides the pixel block of each of the color component images into two areas I and II using the detected edge.

In operation 1050, the correlation prediction unit 913 predicts pixel values in each of the areas I and II of the B color component image and pixel values in each of the areas I and II of the R color component image using a corresponding reconstructed pixel block of the G color component image. In other words, the correlation prediction unit 913 predicts pixel values of a pixel block, which corresponds to the first area I, of the B color component image and pixel values of a pixel block, which corresponds to the first area I, of the R color component image using pixel values $g'_{i,j}$ in the first area I of the reconstructed G color component image. Similarly, the correlation prediction unit 913 predicts pixel values of a pixel block, which corresponds to the second area II, of the B color component image and pixel values of a pixel block, which corresponds to the second area II, of the R color component image using pixel values $g'_{i,j}$ in the second area II of the reconstructed G color component image.

More specifically, assuming that a pixel block of each color component image is divided into n areas, that $g'_{(k)i,j}$ denotes a pixel value in a $k^{th}$ area (k=1, 2, ..., n) of a pixel block of the reconstructed G color component image, that $\overline{b_{(k)i,j}}$ denotes a prediction pixel value, which corresponds to $g'_{(k)i,j}$, in a $k^{th}$ area of a pixel block of the B color component image, that e denotes a predetermined weight indicating a correlation between the $k^{th}$ area of the G color component image and the $k^{th}$ area of the B color component, and that f denotes a predetermined offset value, pixel values of the pixel block of the B color component image can be predicted using Equation 9 below, which is similar to Equation 1.

$$\overline{b_{(k)i,j}} = e \times g'_{(k)i,j} + f \quad (9)$$

In Equation 9, the constants e and f may be determined as values that minimize differences between prediction pixel values in each of the areas of the B color component image and corresponding original pixel values. Alternatively, e may be determined as 1, and f may be determined as the average of differences between pixel values of an original pixel of the B color component image and pixel values of a corresponding reconstructed pixel block of the G color component image.

Similar to the prediction of pixel values in each area of a pixel block of the B color component image, pixel values of in each area of a pixel block of the R color component image can also be predicted.

When pixel values of the pixel block of the R color component image are predicted, pixel values of the reconstructed pixel block of the B color component image in the same area, instead of pixel values of the reconstructed pixel block of the G color component image, may be used as in Equation 6.

Figure 12:
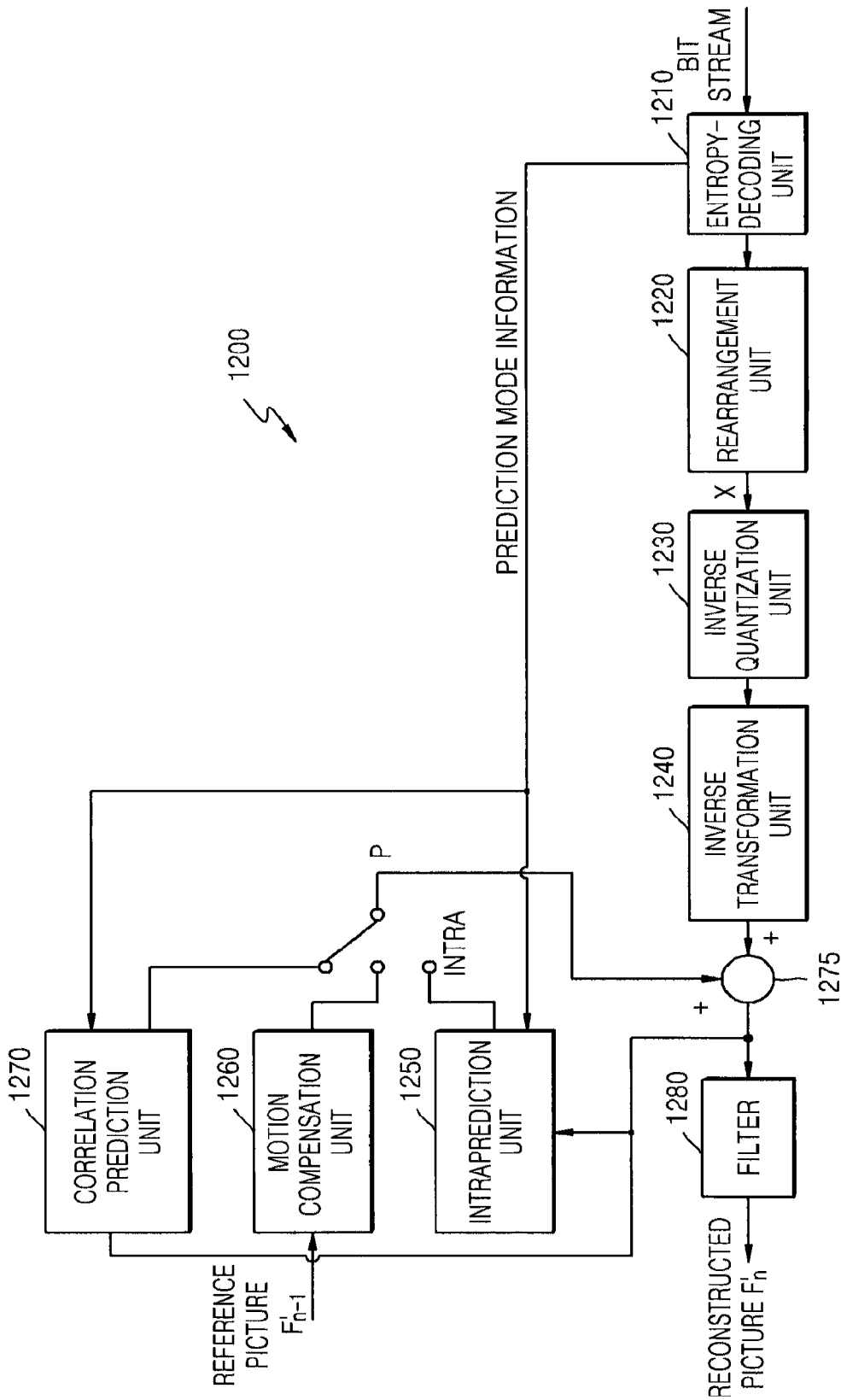
FIG. 12 is a block diagram of an image decoding apparatus according to an exemplary embodiment of the present invention.

FIG. 12 is a block diagram of an image decoding apparatus according to an exemplary embodiment of the present invention.

Referring to FIG. 12, the image decoding apparatus 1200 includes an entropy-decoding unit 1210, a rearrangement unit 1220, an inverse quantization unit 1230, an inverse transformation unit 1240, an intra prediction unit 1250, a motion compensation unit 1260, a correlation prediction unit 1270, and a filter 1280.

The entropy-decoding unit 1210 and the rearrangement unit 1220 receive a compressed bitstream and perform entropy-decoding, thereby generating a quantized coefficient. The inverse quantization unit 1230 and the inverse transformation unit 1240 respectively perform inverse quantization and inverse transformation on the quantized coefficient in order to extract residue information, motion vector information, and prediction mode information of each color component image. Here, the prediction mode information may include a predetermined syntax indicating whether the compressed bitstream is a bitstream encoded by the method according to an exemplary embodiment of the present invention. If the compressed bitstream is encoded by the image encoding method according to the exemplary embodiment of the present invention, the prediction mode information may include predictor information used to predict pixel values of pixel blocks of the other color component images. For example, the predictor information may include a and b of Equation 1, c and d of Equation 6, and e and f of Equation 9.

If the current pixel block is an inter-predicted pixel block, the motion compensation unit 1260 generates a prediction pixel block of the current pixel block by motion compensation and estimation.

The intra prediction unit 1250 performs intra prediction on a pixel block having a predetermined size of a first color component image among a plurality of color component images to generate a prediction pixel block of the first color component image.

The addition unit 1275 adds the prediction pixel block of the first color component image and a first residue output from the inverse transformation unit 1240 in order to decode the pixel block of the first color component image.

The decoded pixel block of the first color component image is input to the correlation prediction unit 1270. The correlation prediction unit 1270 decodes a corresponding pixel block of another color component image using the decoded pixel block of the first color component image.

More specifically, like the correlation prediction unit 314 of FIG. 3, the correlation prediction unit 1270 substitutes pixel values of the decoded pixel block of the first color component image into Equation 1, thereby predicting pixel values of a pixel block of a second color component image or a third color component image. When predicting the third color component image using the reconstructed second color component image, pixel values of the pixel block of the third color component image can be predicted using pixel values of the reconstructed pixel block of the second color component image as in Equation 6.

By adding a second residue and a third residue output from the inverse transformation unit 1240 to prediction pixel blocks of the second color component image and the third color component image, respectively, predicted by the correlation prediction unit 1270, the pixel block of the second color component image and the pixel block of the third color component image are decoded.

When decoding a bitstream which is encoded on an area basis using the method of FIG. 10 described above, that is, by detecting an edge existing in a pixel block, the image decoding apparatus 1200 may further include an edge detection unit (not shown) that detects an edge in a pixel block of a first color component image in a received bitstream including a plurality of encoded color component images, and an area division unit (not shown) that divides a pixel block of each of the color component images using the detected edge. In this case, like the correlation prediction unit 913 of FIG. 9, the correlation prediction unit 1270 predicts pixel values in each divided area of corresponding pixel blocks of the B color component image and the R color component image using a decoded pixel block of the G color component image.

Figure 13:
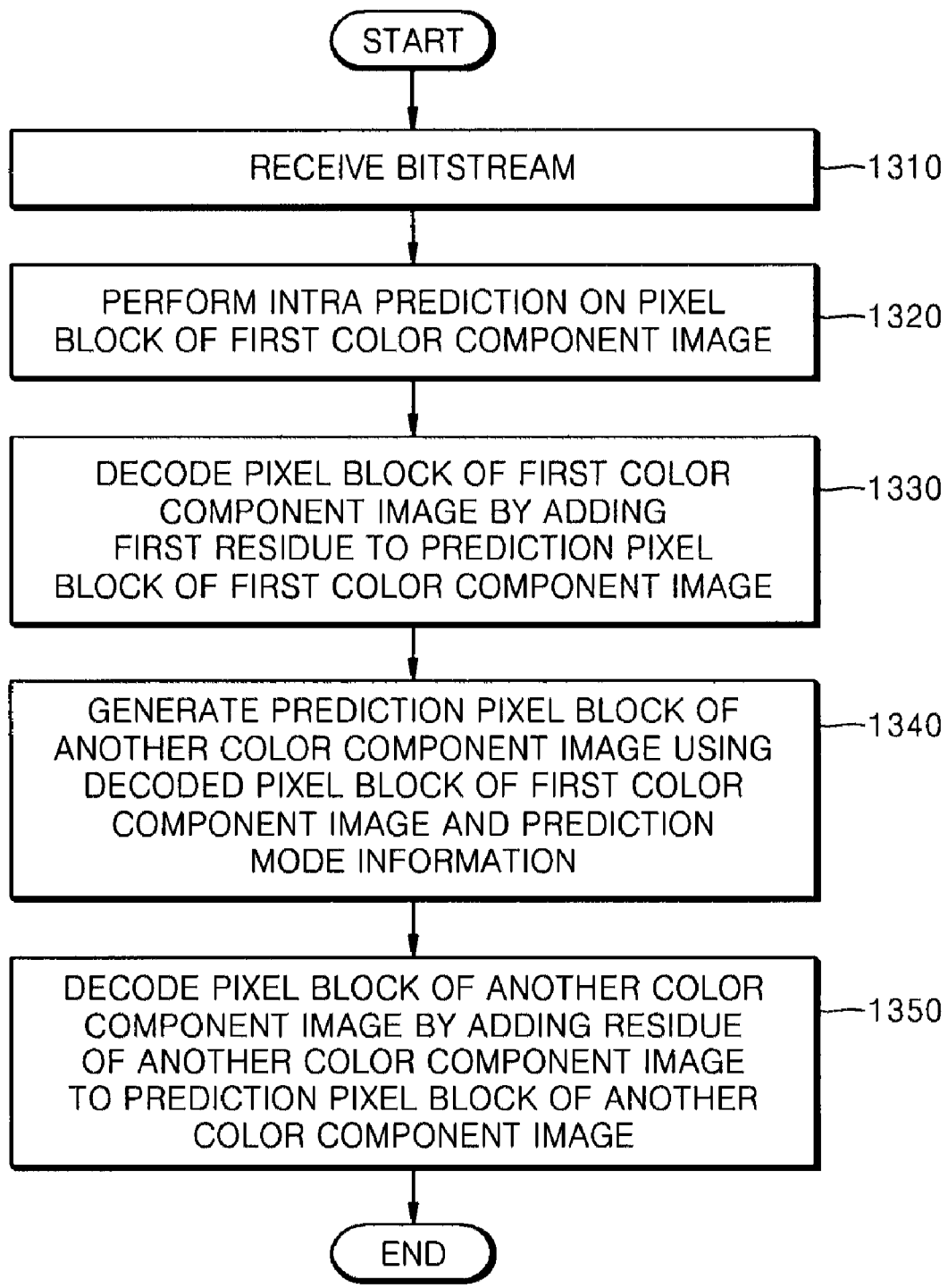
FIG. 13 is a flowchart illustrating an image decoding method according to an exemplary embodiment of the present invention.

FIG. 13 is a flowchart illustrating an image decoding method according to an exemplary embodiment of the present invention.

Referring to FIG. 13, a bitstream including at least two encoded color component images is received in operation 1310.

In operation 1320, intra prediction is performed on a pixel block having a predetermined size of a first color component image among a plurality of color component images included in the bitstream to generate a prediction pixel block of the first color component image.

In operation 1330, the prediction pixel block of the first color component image is added to a first residue to decode the pixel block of the first color component image.

In operation 1340, pixel values of pixel blocks of the other color component images are predicted using the decoded pixel block of the first color component image and prediction mode information included in a header of the bitstream, thereby generating a prediction pixel block of the other color component image. As described above, the prediction mode information may include predictor information used to predict the pixel values of the pixel blocks of the other color component images. For example, the predictor information may include a and b of Equation 1, c and d of Equation 6, and e and f of Equation 9. The correlation prediction unit 1270 generates a predictor, such as Equation 1, Equation 6, and Equation 9, using the prediction mode information, and substitutes the pixel values of the decoded pixel block of the first color component image into Equation 1, 6 or 9, to predict the pixel values of the pixel blocks of the second and the third color component images. Alternatively, the correlation prediction unit 1270 may predict the pixel values of a corresponding pixel block of the third color component image using the decoded second color component image.

In operation 1350, an inversely transformed second residue and an inversely transformed third residue are added to prediction pixel blocks of the second color component image and the third color component image, respectively, thereby decoding the pixel blocks of the second color component image and the third color component image.

Figure 14:
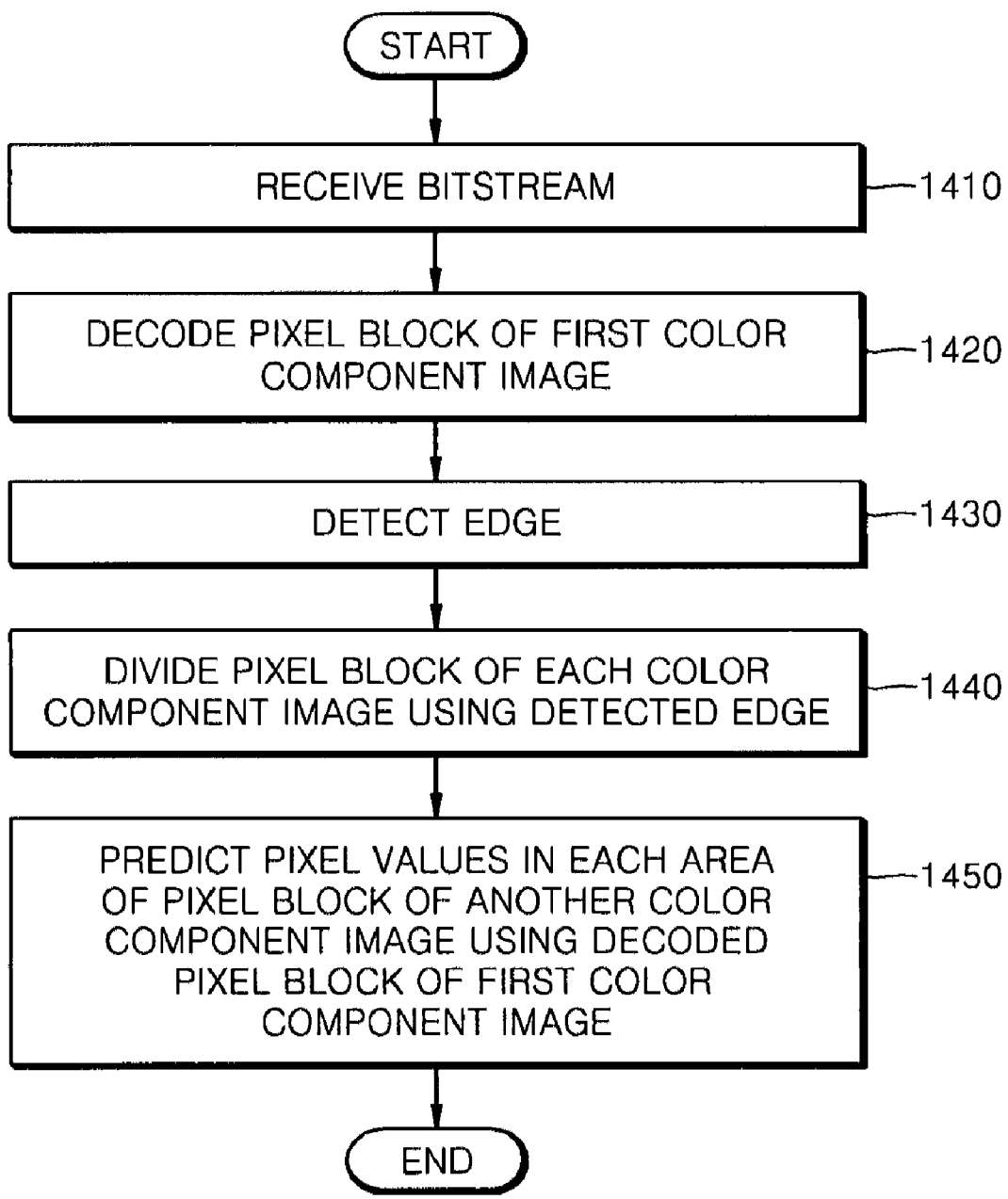
FIG. 14 is a flowchart illustrating an image decoding method according to another exemplary embodiment of the present invention.

FIG. 14 is a flowchart illustrating an image decoding method according to another exemplary embodiment of the present invention. The image decoding method according to the current exemplary embodiment of the present invention is similar to the image decoding method described above with reference to FIG. 13, except that pixel blocks of color component images which have been encoded on an area basis, wherein the areas are divided by an edge existing in a pixel block of each of the color component images, are decoded.

Referring to FIG. 14, a bitstream including at least two encoded color component images is received in operation 1410.

In operation 1420, a pixel block having a predetermined size of a first color component image among the color component images is decoded.

In operation 1430, an edge in the decoded pixel block of the first color component image is detected.

In operation 1440, the decoded pixel block of the first color component image and corresponding pixel blocks of the other color component images are divided using the detected edge.

In operation 1450, pixel values in each area of the pixel blocks of the second color component image and the third color component image are predicted using the decoded pixel block of the first color component image.

The predicted pixel values in each area of the second color component image and the third color component image are combined to form prediction pixel blocks of the second color component image and the third color component image, respectively. The prediction pixel blocks of the second and the third color component images are added to inversely transformed second residue and third residue, thereby decoding the pixel blocks of the second color component image and the third color component image.

The present invention can also be embodied as a computer readable code on a computer-readable recording medium. The computer readable recording medium is any data storage device that can store data which can be thereafter read by a computer system. Examples of computer readable recording media include read-only memory (ROM), random-access memory (RAM), CD-ROMs, magnetic tapes, floppy disks, and optical data storage devices. The computer readable recording medium can also be distributed over a network of coupled computer systems so that the computer readable code is stored and executed in a decentralized fashion.

As described above, according to exemplary embodiments of the present invention, predictive encoding is performed using a correlation between a plurality of color component images forming a single image, thereby improving encoding efficiency.

Moreover, according to the exemplary embodiments of the present invention, encoding is performed on an RGB input image in an RGB domain with out transformation into a YUV domain, thereby preventing color distortion, etc., occurring when transforming the RGB image into another color format and thus improving display quality.

While the present invention has been particularly shown and described with reference to exemplary embodiments thereof, it will be understood by those of ordinary skill in the art that various changes in form and details may be made therein with out departing from the spirit and scope of the present invention as defined by the following claims.

What is claimed is:

1. An image decoding method comprising:
   receiving a bitstream of an encoded image including at least two color component images;
   decoding a pixel block of a first color component image among the color component images;
   generating a prediction pixel block of a second color component image using the decoded pixel block of the first color component image; and
   decoding a pixel block of the second color component image using the prediction pixel block of the second color component image.

2. The image decoding method of claim 1, wherein the encoded image comprises a red (R) color component image, a green (G) color component image, and a blue (B) color component image.

3. The image decoding method of claim 1, wherein the decoding the pixel block of the first color component image comprises:
   decoding a first residue of the pixel block of the first color component image included in the bitstream;
   performing intra prediction on the pixel block of the first color component image to generate a prediction pixel block of the first color component image; and
   decoding the pixel block of the first color component image by adding the decoded first residue to the prediction pixel block of the first color component image.

4. The image decoding method of claim 1, wherein the decoding the pixel block of the second color component image comprises:
   extracting a weight a indicating a correlation between the first color component image and the second color component image and an offset value b from the bitstream;
   generating the prediction pixel block of the second color component image, pixel values of the prediction pixel block of the second color component image being predicted using the equation:

$$\overline{Y_{i,j}} = a \times X'_{i,j} + b,$$

where $X'_{i,j}$ denotes a pixel value in an $i^{th}$ row and a $j^{th}$ column of the decoded pixel block of the first color component image, and $\overline{Y_{i,j}}$ denotes a prediction pixel value, which corresponds to $X'_{i,j}$, in an $i^{th}$ row and a $j^{th}$ column of the prediction pixel block of the second color component image;
   decoding a second residue that is a difference between the original pixel block of the second color component image and the prediction pixel block of the second color component image included in the bitstream; and
   decoding the pixel block of the second color component image by adding the decoded second residue to the prediction pixel block of the second color component image.

5. The image decoding method of claim 4, wherein the decoding the pixel block of the second color component image further comprises:
   extracting a weight c indicating a correlation between the second color component image and a third color component image and an offset value d from the bitstream;
   generating a prediction pixel block of the third color component image, pixel values of the prediction pixel block of the third color component image being predicted using the equation:

$$\overline{Z_{i,j}} = c \times Y'_{i,j} + d,$$

where $Y'_{i,j}$ denotes a pixel value in an $i^{th}$ row and a $j^{th}$ column of the decoded pixel block of the second color component image, and $\overline{Z_{i,j}}$ denotes a prediction pixel value, which corresponds to $Y'_{i,j}$, in an $i^{th}$ row and a $j^{th}$ column of the prediction pixel block of the third color component image;

decoding a third residue that is a difference between the original pixel block of the third color component image and the prediction pixel block of the third color component image included in the bitstream; and decoding the pixel block of the third color component image by adding the decoded third residue to the prediction pixel block of the third color component image.

6. The image decoding method of claim 1, wherein the decoding a pixel block of a second color component image comprises:

generating the prediction pixel block of the second color component image using a predicted pixel block of the first color component image; and adding the prediction pixel block of the second color component image to a residue of the second color component image.

7. An image decoding apparatus comprising:

a decoding unit which receives a bitstream of an encoded image including at least two color component images, decodes a pixel block of a first color component image among the color component images by intra prediction, and outputs the decoded pixel block of the first color component image; and a correlation prediction unit which generates a prediction pixel block of a second color component image using the decoded pixel block of the first color component image, and decodes a pixel block of the second color component image using the prediction pixel block of the second color component image.

8. The image decoding apparatus of claim 7, wherein the correlation prediction unit generates the prediction pixel block of the second color component image, pixel values of the prediction pixel block of the second color component image being predicted using the equation:

$$\overline{Y_{i,j}} = a \times X'_{i,j} + b,$$

where i and j are integers, $X'_{i,j}$ denotes a pixel value in an $i^{th}$ row and a $j^{th}$ column of the decoded pixel block of the first color component image, $\overline{Y_{i,j}}$ denotes a prediction pixel value, which corresponds to $X'_{i,j}$, in an $i^{th}$ row and a $j^{th}$ column of the prediction pixel block of the second color component image, a denotes a weight indicating a correlation between the first color component image and the second color component image, and b denotes an offset value.

9. The image decoding apparatus of claim 8, wherein the correlation prediction unit generates a prediction pixel block of a third color component image, pixel values of the prediction pixel block of the third color component image being predicted using the equation:

$$\overline{Z_{i,j}} = c \times Y'_{i,j} + d,$$

where $Y'_{i,j}$ denotes a pixel value in an $i^{th}$ row and a $j^{th}$ column of the decoded pixel block of the second color component image, $\overline{Z_{i,j}}$ denotes a prediction pixel value, which corresponds to $Y'_{i,j}$, in an $i^{th}$ row and a $j^{th}$ column of the third color component image, c denotes a weight indicating a correlation between the second color component image and the third color component image, and d denotes an offset value.

10. The image decoding apparatus of claim 7, wherein the correlation prediction unit generates the prediction pixel block of the second color component image using a predicted pixel block of the first color component image; and adds the prediction pixel block of the second color component image to a residue of the second color component image.

11. A non-transitory computer readable recording medium storing a computer program for performing an image decoding method, the method comprising:

receiving a bitstream of an encoded image including at least two color component images;

decoding a pixel block of a first color component image among the color component images;

generating a prediction pixel block of a second color component image using the decoded pixel block of the first color component image; and decoding a pixel block of the second color component image using the prediction pixel block of the second color component image.

12. The non-transitory computer readable recording medium of claim 11, wherein the decoding a pixel block of a second color component image comprises:

generating the prediction pixel block of the second color component image using a predicted pixel block of the first color component image; and adding the prediction pixel block of the second color component image to a residue of the second color component image.

* * * * *